United States Patent
Ciotic et al.

(10) Patent No.: US 9,504,228 B1
(45) Date of Patent: Nov. 29, 2016

(54) ODOR-REMOVING TRAP SYSTEM FOR CAT LITTER BOXES

(71) Applicants: Egor Ciotic, Fair Oaks, CA (US); Edward G. Ciotic, Fair Oaks, CA (US)

(72) Inventors: Egor Ciotic, Fair Oaks, CA (US); Edward G. Ciotic, Fair Oaks, CA (US)

( * ) Notice: Subject to any disclaimer, the term of this patent is extended or adjusted under 35 U.S.C. 154(b) by 0 days.

(21) Appl. No.: 13/998,716

(22) Filed: Nov. 25, 2013

(51) Int. Cl.
*A01K 29/00* (2006.01)
*A01K 1/00* (2006.01)
*A01K 1/01* (2006.01)

(52) U.S. Cl.
CPC ............ *A01K 1/0052* (2013.01); *A01K 1/0107* (2013.01)

(58) Field of Classification Search
CPC .......................... A01K 1/0052; A01K 1/0107
USPC .................................................. 119/165, 173
See application file for complete search history.

(56) References Cited

U.S. PATENT DOCUMENTS

| | | | |
|---|---|---|---|
| 4,095,559 A | 6/1978 | Griffith | |
| 5,044,325 A | 9/1991 | Miksitz | |
| 5,140,948 A * | 8/1992 | Roberts | 119/165 |
| 5,307,761 A * | 5/1994 | Berger et al. | 119/165 |
| 5,755,181 A * | 5/1998 | Petkovski | 119/163 |
| 5,931,119 A * | 8/1999 | Nissim | A01K 1/0114 119/163 |
| 6,079,364 A * | 6/2000 | Tamba | A01K 1/0114 119/163 |
| 6,123,048 A * | 9/2000 | Alkire et al. | 119/500 |
| 6,176,201 B1 | 1/2001 | Fields | |
| 6,227,147 B1 * | 5/2001 | Ball | 119/484 |
| 7,243,614 B1 * | 7/2007 | Byers | 119/482 |
| 7,490,578 B1 * | 2/2009 | Mottard | A01K 1/0107 119/161 |
| 8,881,680 B1 * | 11/2014 | Woody | A01K 1/0114 119/165 |
| 2006/0201437 A1 * | 9/2006 | Ryan | A01K 1/0107 119/165 |
| 2007/0215057 A1 * | 9/2007 | Geer et al. | 119/165 |
| 2008/0087229 A1 * | 4/2008 | Gabriel et al. | 119/417 |
| 2010/0132624 A1 * | 6/2010 | Ferrer et al. | 119/500 |
| 2011/0048330 A1 * | 3/2011 | Mathews | 119/165 |

OTHER PUBLICATIONS

U.S. Appl. No. 13/694,917, filed Jul. 19, 2014, Ciotic.

* cited by examiner

*Primary Examiner* — Kristen C Hayes
*Assistant Examiner* — Ebony Evans
(74) *Attorney, Agent, or Firm* — Clifford F. Rey

(57) ABSTRACT

An odor-removing trap system for removal of noxious gases emanating from cat litter boxes. The present invention provides an apparatus including an enclosure for capturing, filtering and removing noxious gases associated with cat waste products. Such gases rise upwardly within the enclosure wherein the gases are trapped and drawn from the enclosure. In one embodiment the gases are urged into an exhaust conduit disposed in fluid (i.e. air) transfer communication with the enclosure and flow to the exterior of the building by convection, air pressure or by vacuum created by a brushless fan motor. Such fan motor is powered by a battery pack or, alternatively, is electrically connected to an AC power source and can be actuated automatically by a motion detector whenever a cat enters the enclosure. In alternative embodiments the noxious gases are drawn through an air filter assembly including an activated charcoal filter element and absorbed therein.

16 Claims, 27 Drawing Sheets

ODOR-REMOVING TRAP SYSTEM FOR CAT LITTER BOXES

BACKGROUND OF INVENTION

1. Field of Invention

The present invention relates to cat litter boxes and, more particularly, to an odor-removing trap system for capturing, filtering and venting of noxious gases related to the use of litter boxes by domestic housecats.

The use of litter boxes by cats produces unpleasant odors which are well known to an estimated eighty-six million cat owners in the United States alone. A cat's body temperature and metabolism is higher than a human's metabolism, as is the rate of heat energy released by a cat due to its smaller physical size. The cat's waste products produce noxious gases, bacteria and allergens, which instantaneously permeate the ambient air in the room where the litter box resides. Traveling with a cat and a litter box in an automobile exacerbates the odor problem.

The conventional way to counteract such litter box odor is to use a cat litter product which is liquid absorbent and/or is chemically treated to eliminate odors. However, such absorbent and/or chemically treated litter materials are relatively ineffective at eliminating the odor problem. The cat owner may resort to using a deodorant spray or even opening a door or window, which is inconvenient and energy inefficient during inclement weather.

Alternatively, cat owners may locate the litter box in a bathroom or other room that has an exhaust fan installed in the ceiling, which typically requires about forty to one-hundred-eighty watts of electrical power to operate. In order to remove unpleasant odors, such a ceiling fan must operate for several minutes or longer to remove the entire volume of air within the room and exhaust it to the exterior of the home or other structure.

Such ceiling exhaust fans use substantial electrical power and, thus, are expensive to operate. Further, when such an exhaust fan is operating there is no specific airflow generated to carry away noxious odors from the area surrounding the litter box. Thus, such a ceiling exhaust fan must remove a substantial volume of air to the exterior of the home or other structure that has either been heated or, alternatively, which has been cooled depending on the locale and weather conditions. Accordingly, the operation of such conventional exhaust fans is clearly energy inefficient and also generates an unpleasant noise for others in the vicinity.

Thus, the present invention has been developed to resolve these problems and other shortcomings of the prior art.

2. Description of Related Prior Art

Ventilated cat litter boxes are known in the prior art and while the structural arrangements of such systems may, at first appearance, have similarities to the present invention, they differ in material respects.

For example, U.S. Pat. No. 4,095,559 to Griffith filed Oct. 27, 1976, entitled Ventilated Litter Box, discloses a litter box for pet animals which is provided with a ventilating enclosure that is only partially enclosed. When connected to a means for exhausting air therefrom, the box and the litter in it are ventilated by flow of air from the box into the enclosure by an exhaust fan from which it is exhausted elsewhere. The enclosed portion of the box is formed by the floor and sidewalls of the box, a partial cover and a foraminous barrier between the cover and the floor. The cat litter box containing waste products is not enclosed, the waste products are open to the ambient air and the noxious gases associated with such waste products are not trapped and filtered in the manner of the present invention.

U.S. Pat. No. 6,176,201 (hereinafter '201 patent) to Fields filed Sep. 16, 1999, entitled Ventilated Cat Litter Box, discloses a ventilated cat litter box for ventilating cat litter and simultaneously keeping the surrounding area litter free. The ventilated cat litter box includes a box which is generally rectangular in shape. A screen covers the bottom portion of the box whereon the litter box resides. An electric fan is mounted on the inside of the box and an actuating device is operationally connected to the fan. A power source is operatively coupled to the actuating device and a timer.

However, the ventilated cat litter box of the '201 patent fails to disclose the novel features of the present invention including, but not limited to, the air filtration assemblies including an activated charcoal filter element; a miniature, brushless fan motor that is operable with either an AC power source or, alternatively, with a battery pack; and/or the other structural embodiments such as the tent-like enclosures of the present trap system.

U.S. Pat. No. 5,044,325 (hereinafter '325 patent) to Miksitz filed Dec. 13, 1990, entitled, Ventilated Litter Box, discloses a ventilated litter box including a housing and a tray for containing a bed of litter material. The tray is provided with a porous bottom spaced from the bottom of the housing to define an air space. An exhaust fan is connected to a port through the wall of the housing to draw air downwardly through the litter bed to exhaust the litter odors.

The ventilated litter box of the '325 patent also fails to disclose the novel features of the present invention including, but not limited to, the air filtration assemblies including an activated charcoal filter element; a miniature, brushless fan motor which is operable with either an AC power source or, alternatively, with a suitable battery pack; and/or the other novel structural embodiments such as the tent-like enclosures of the present system.

Pending U.S. patent application Ser. No. 13/694,917 to Ciotic, the same inventor named herein, filed Jan. 19, 2013, entitled Odor-Removing Hinge System for Toilets and Portable Commodes discloses various air filtration assemblies which are similar to those disclosed herein and may be useful in understanding the present invention.

While these devices fulfill their respective, particular objectives and requirements, the aforementioned patents do not disclose the novel features of present invention for an Odor-Removing Trap System for Cat Litter Boxes.

SUMMARY OF THE INVENTION

Accordingly, the present invention is an odor-removing trap system for cat litter boxes that provides for removal of noxious gases and odors emanating from cat litter boxes. The present system includes an odor-removing apparatus including an airtight enclosure assembly which traps, filters and exhausts noxious gases, bacteria and allergens associated with cat waste products contained in the litter box.

The waste products are released at the animal's body temperature which is between 100 and 102 degrees Fahrenheit. Since the noxious gases associated with the waste products are warmer than the surrounding air, such noxious gases rise upwardly within the present enclosure assembly wherein the gases are trapped in its airtight upper portion and urged from the enclosure by a miniature, brushless fan motor before escaping into the ambient air and, thus, the noxious gases and unpleasant odors are eliminated.

In one embodiment of the present invention, the noxious gases trapped within the enclosure surrounding the litter box are drawn into an outlet fixture disposed in fluid communication with an exhaust line assembly installed in an adjacent wall of the room wherein the airtight trap system is attached via connective tubing in fluid (i.e. air) transfer communication with the enclosure. The noxious gases flow to the exterior of the building by convection, air pressure and/or by vacuum created by the brushless fan motor installed in the exhaust conduit assembly.

In an alternative embodiment the noxious gas mixture is directed into an intake port within an air filter assembly disposed in fluid (i.e. air) transfer communication with the enclosure assembly. The air filter assembly discharges the filtered gas mixture via an outlet port directly to the ambient room air surrounding the enclosure assembly. The air filter assembly includes an activated charcoal filter element wherein the noxious gas mixture is drawn by the miniature, brushless fan motor. Activated charcoal is a form of carbon that has been processed to make it highly porous and, thus, to provide it with a large surface area available for absorption and/or chemical reactions.

The brushless fan motor is powered by a suitable battery pack or, alternatively, is electrically connected to an AC power source via a direct current (DC) transformer. In such embodiments the fan is actuated automatically by a motion detector whenever a cat enters the enclosure. An LED (i.e. light emitting diode) simultaneously illuminates the enclosure during operation of the fan motor.

Advantageously, the present odor-removing trap system is designed to be used in combination with any conventional cat litter box currently on the market. The present system offers numerous other advantages over the prior art including, but not limited to, alternative embodiments wherein the present enclosure assembly also functions as a cat litter box to receive litter directly so that a separate litter box is not required. In other embodiments the present system is designed to be portable for traveling with a pet being operable with a suitable battery pack within a vehicle and being readily collapsible for convenient transport and storage.

In addition, the present odor-removing system is energy efficient operating at less than one watt of electrical power. Further, the present system is inexpensive to manufacture in various configurations and sizes being constructed of readily available components and materials.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Those skilled in the art will appreciate that the conception upon which this disclosure is based may readily be utilized as a basis for the designing of other structures, methods, and systems for carrying out the purposes of the present invention. It is important, therefore, that the claims be regarded as including such equivalent constructions insofar as they do not depart from the spirit and scope of the present invention.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

The following description is presented to enable any person skilled in the art to make and use the present invention, and is provided in the context of a particular application and its requirements.

Figure 1A:
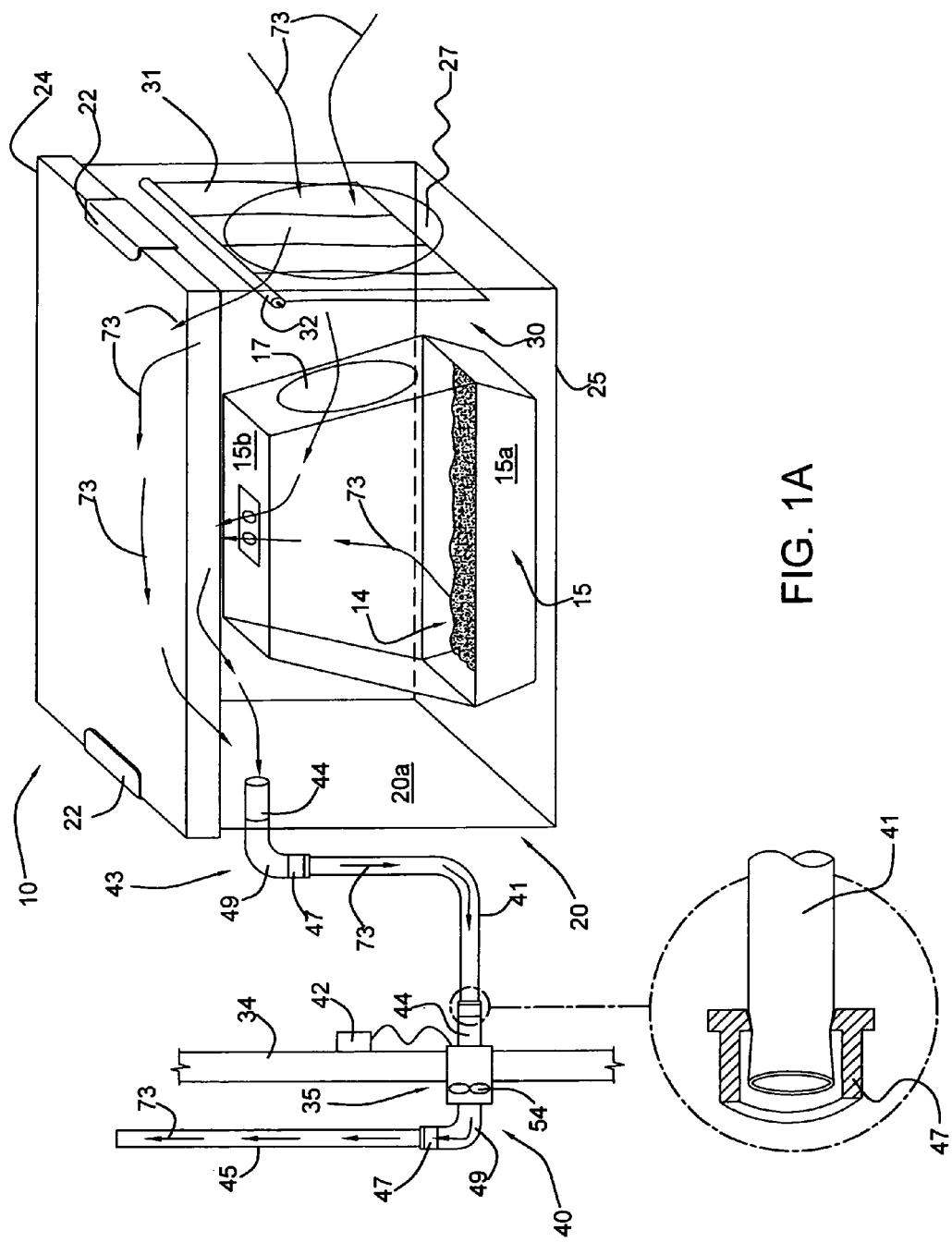
FIG. 1A is a perspective view of an embodiment of the present odor-removing trap system including an external exhaust conduit for use with the present system.

With further reference to the drawings there are shown therein multiple embodiments of an Odor-Removing Trap System for Cat Litter Boxes in accordance with the present invention. Referring to FIG. 1A there is shown therein an embodiment of such an odor-removing trap system, indicated generally at 10. The present odor-removing trap system 10 functions to trap the noxious gases, bacteria and allergens emanating from the cat litter box, indicated generally at 15, to prevent their dispersal into the ambient air.

In the present invention such noxious gases, bacteria and allergens are directed through an exhaust system, indicated generally at 40, via tubing 41 to the exterior of the building as shown in FIG. 1A. Alternatively, such noxious gas mixture is filtered through a filter assembly, indicated generally at 50, (FIG. 2) prior to recirculation into the ambient room air without perceptible odor.

In the present odor-removing trap system 10 the litter box 15 shown in FIG. 1A is disposed within an enclosure assembly, indicated generally at 20, wherein the exhaust system 40 and/or the filter assembly 50 (FIG. 2) are attached in fluid (i.e. air) transfer communication as described hereinafter in further detail.

In the embodiment shown in FIG. 1A, a cat litter box 15 of the type having a bottom tray 15a for containing cat litter 14 and having a cover 15b including an opening 17 to permit entry and exit of the cat (not illustrated) is positioned within enclosure assembly 20. However, it will be appreciated that the present system 10 is designed to be used in combination with any commercially available style of cat litter box on the market.

Enclosure assembly 20 comprises a generally rectangular, cuboid body member 25 and a detachable lid member 24 having handles 22 of a known type, which clamp the lid member 24 to the body member. Enclosure assembly 20 including body member 25, lid member 24 and handles 22 are fabricated from an engineered plastic such as polyurethane, polyvinylchloride or other suitable thermoplastic material by injection molding or another known process. In the embodiment shown in FIG. 1A, body member 25 and lid member 24 are fabricated from a clear thermoplastic material, but other translucent and opaque materials can be utilized.

Figure 1B:
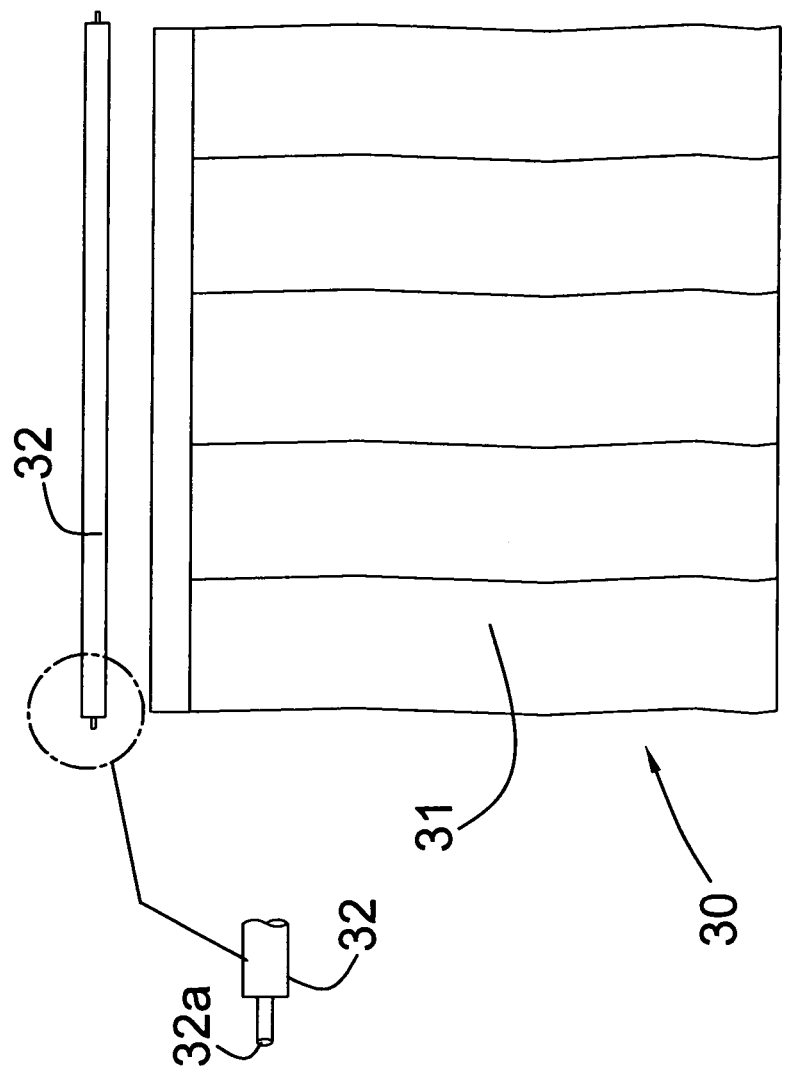
FIG. 1B is an enlarged plan view of the gate assembly of the present invention shown removed from the interior of the body enclosure assembly of the present invention.

Enclosure assembly 20 further includes a litter gate assembly, indicated generally at 30, to prevent the spillage of cat litter 14 from the enclosure 20 during use. More particularly, gate assembly 30 (FIG. 1B) is constructed of a plurality of rectangular sections or strips 31 of clear, flexible plastic or other suitable material, which are attached to an elongated gate support rod 32 in generally parallel relation and hang downwardly therefrom adjacent to entry opening 27 within body member 25 as shown in FIG. 1A. Gate assembly 30 is pivotally mounted on the opposite sidewalls of enclosure assembly 20 by use of cylindrical tip portions 32a formed at either end of support rod 32 as shown in the detail view of FIG. 1B. Tip portions 32a have a reduced diameter relative to support rod 32 and are configured to engage mating holes (not shown) formed in the opposite sidewalls of body member 25.

Still referring to the embodiment shown in FIG. 1A, the present odor-removing system 10 includes an exhaust system 40 attached in fluid (i.e. air) transfer communication with enclosure assembly 20. It will be appreciated that the noxious gases that are produced by cat waste products are higher in temperature (i.e. 100 to 102 degrees Fahrenheit) than the ambient air within the enclosure 20 and such gases rise upwardly wherein the gases are trapped adjacent to lid member 24 and drawn from the enclosure using the present system.

More particularly, in this embodiment of the present system 10, noxious gases from the litter box 15 are trapped in the upper, airtight portion of the enclosure assembly 20 adjacent lid member 24 and carried therefrom (as shown by directional arrows 73) via exhaust tubing 41 attached to an outlet port, indicated generally at 43, including an elbow fitting or elbow 49 and a mating coupling 44 installed in an end wall 20a of the enclosure assembly 20. A flexible, vinyl tubing 41 having a one-half inch I.D. (i.e. inside diameter) is suitable for this purpose. Airtight pressure adapters 47 as shown in the detail view of FIG. 1A secure tubing 41 to outlet port assembly, indicated generally at 43, to the fan module 35 via coupling 44. In turn, exhaust line 45 is connected to an opposite side of fan module 35 via a pressure adapter 47 to an elbow 49 within exhaust system 40 as shown.

Tubing 41 is received in fan module, indicated generally at 35, which is installed in an adjacent wall 34. A miniature exhaust fan 54 disposed within fan module 35 directs the flow of the air and noxious gas mixture to the exterior of the building via an exhaust line 45, which can also be made from a one-half inch I.D. (i.e. inside diameter) polyvinylchloride (PVC) or other suitable material.

Still referring to the embodiment of FIG. 1A, the brushless fan motor 54 receives power for its operation via a power supply 42 electrically connected with the fan motor that converts alternating current (AC) supplied by an electrical system into 12 Volt direct current (DC) as required to operate the fan motor. A brushless fan motor 54 of the type manufactured for cooling laptop computers that operates on 12 Volts DC and 0.08 amps and which uses less than 1.0 watts of power (i.e. 0.08 amps×12 Volts=0.96 watts of power) is suitable for this application.

Thus, the pathway that air and noxious gases follow when the present system 10 is utilized is that ambient air ingresses via opening 27 into the enclosure assembly 20, mixes with any noxious gases emanating from the litter box 15, passes through outlet fixture or outlet port 43 and attached tubing 41 into fan module 35 and egresses via exhaust line or conduit 45 to the exterior of the building.

Figure 2:
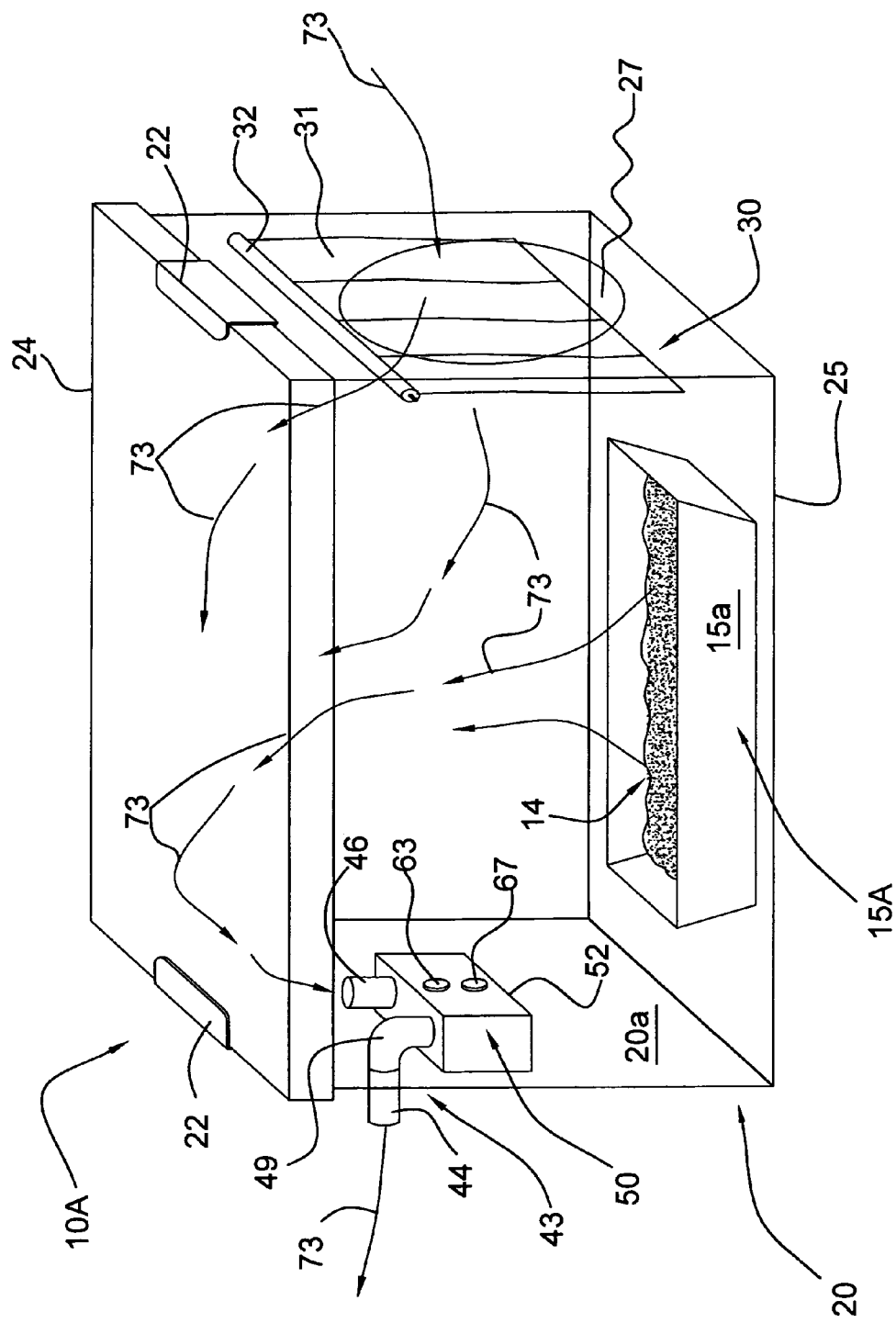
FIG. 2 is a perspective view of another embodiment of the present odor-removing trap system including an internally mounted air filter assembly.

With reference to FIG. 2, another embodiment of the present system, indicated generally at 10A, will now be described. In the embodiment shown in FIG. 2 an alternative litter box 15A consisting only of a bottom tray 15a containing cat litter 14 is similarly disposed within enclosure assembly 20. Enclosure assembly 20 including body member 25, lid member 24 and handles 22 are also fabricated from a clear, engineered plastic such as polyurethane, polyvinylchloride or other suitable material and remain as described hereinabove.

In this embodiment of the present system, enclosure assembly 20 also includes an access opening 27 having a gate assembly, indicated generally at 30, to prevent the spillage of cat litter from the enclosure 20 during use.

As illustrated in FIG. 2 the present invention also includes air filtering means including, but not limited to, the following structures. In the embodiment shown in FIG. 2, the air and noxious gas mixture trapped in the upper, airtight portion of the enclosure assembly 20 is directed through a detachable air filter assembly, indicated generally at 50, mounted on an inner surface of an end wall 20a of the enclosure assembly 20. Air filter assembly 50 is secured to end wall 20a by means of an outlet port assembly 43 including elbow 49 and coupling 44, which extends through a mounting hole (not shown) formed in the end wall 20a. Coupling 44 engages elbow 49 by means of an interference fit therebetween, which secures the air filter assembly 50 in position as shown in FIG. 2.

Figure 3:
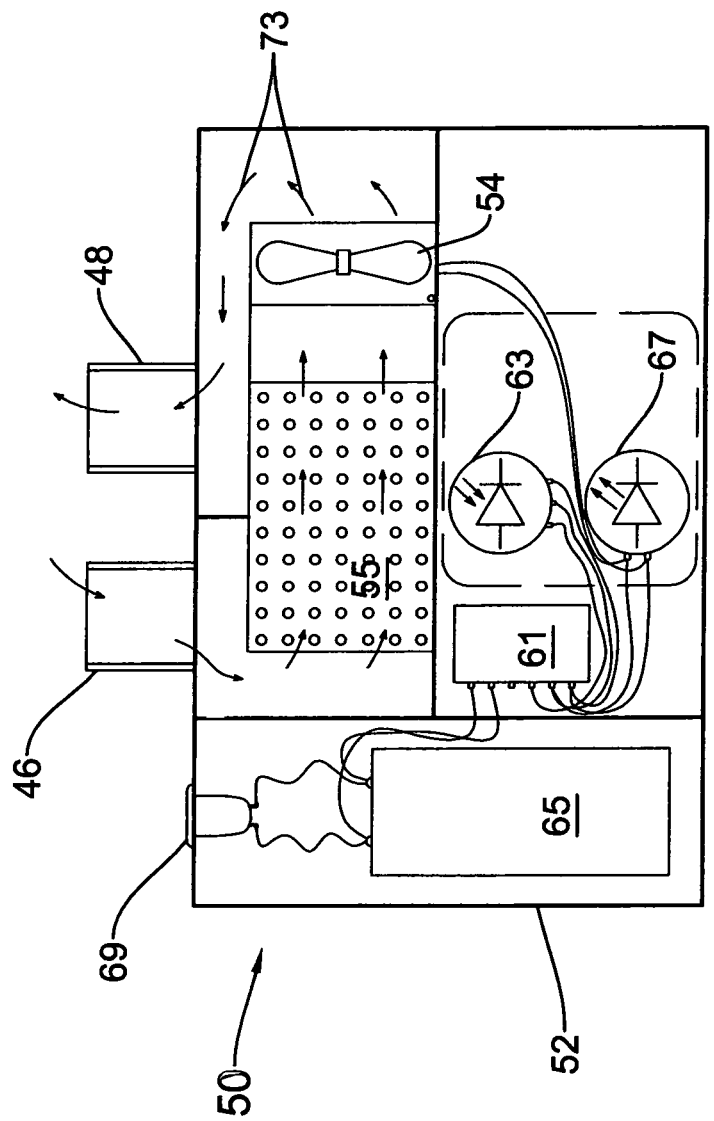
FIG. 3 is a diagrammatic view of the internally mounted air filter assembly of FIG. 2 showing the internal components and further details thereof.

As more clearly shown in FIG. 3, filter assembly 50 comprises a housing 52 which contains an activated charcoal filter element 55, a miniature brushless fan motor 54, an adjustable timer 61, a battery pack 65, a motion detector 63 and an LED (i.e. light emitting diode) 67 for illuminating the interior of the enclosure assembly 20. Housing 52 also includes an inlet 46 and an outlet 48 to permit the noxious gas mixture to flow through the filter assembly 50 in operation. All electronic components within the filter assembly 50 are electrically interconnected by electrical wiring to motion detector 63 and adjustable timer 61 to control the operating time of the fan motor 54 in order to extend the working life of the filter element 55. Filter element 55 may include a dust screen (not shown) to capture litter dust, which will also serve to extend the longevity of the filter element.

Figure 4:
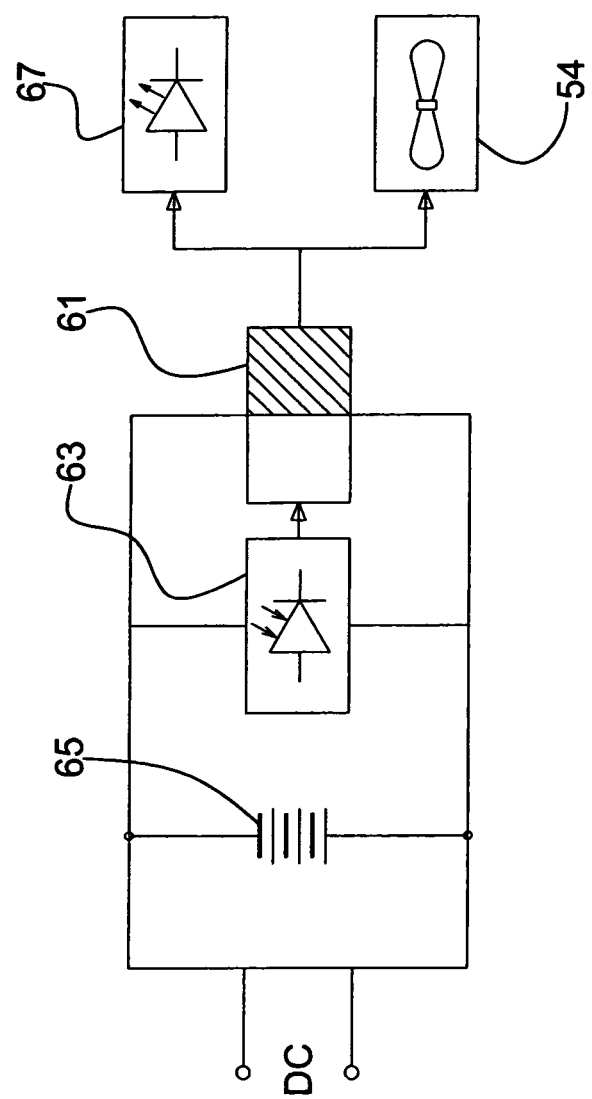
FIG. 4 is an electrical schematic of the air filter assembly of FIG. 3 showing the electrical components and circuitry thereof.

FIG. 4 is an electrical schematic depicting the components and circuitry described hereinabove in relation to FIG. 3.

In the embodiment of the present system 10A illustrated in FIGS. 2 and 3, fan motor 54 receives power for its operation solely from battery pack 65 and operates in a battery mode. Power supply 42 (FIG. 1A) is unplugged from coaxial jack 69 (FIG. 3) to operate system 10A (FIG. 2) in the aforementioned battery mode. Filtered air is delivered from filter assembly 50 into the ambient room air as shown by directional arrows 73 (FIG. 2) producing no perceptible odor.

In an alternative operating mode fan motor 54 receives power for its operation from a power supply 42 of the type shown in FIG. 1A that is electrically connected via power jack 69 (FIG. 3), which converts AC supplied by a residential electrical system into 12 Volts DC as required to operate the brushless fan motor.

Thus, the pathway that air and noxious gases follow when the present system 10A as shown in FIGS. 2 and 3 is utilized is that ambient air ingresses via opening 27 into the enclosure assembly 20, mixes with noxious gases emanating from the litter box 15A, passes into housing 52 via an inlet 46, is drawn through activated charcoal filter element 55 by fan motor 54, exits from housing 52 through outlet port assembly 43 to the exterior of enclosure assembly 20. Activated charcoal is a form of carbon that has been processed to make it highly porous and, thus, to provide it with a large surface area available for absorption and/or chemical reactions. Filtered air is delivered from filter assembly 50 into the ambient room air as shown by directional arrows 73 (FIG. 2) producing no perceptible odor.

When the litter 14 needs to be changed the lid member 24 opens for easy access by manual operation of handles 22, which function as friction latches securing the lid member to the body member 25 in a known manner.

Figure 5:
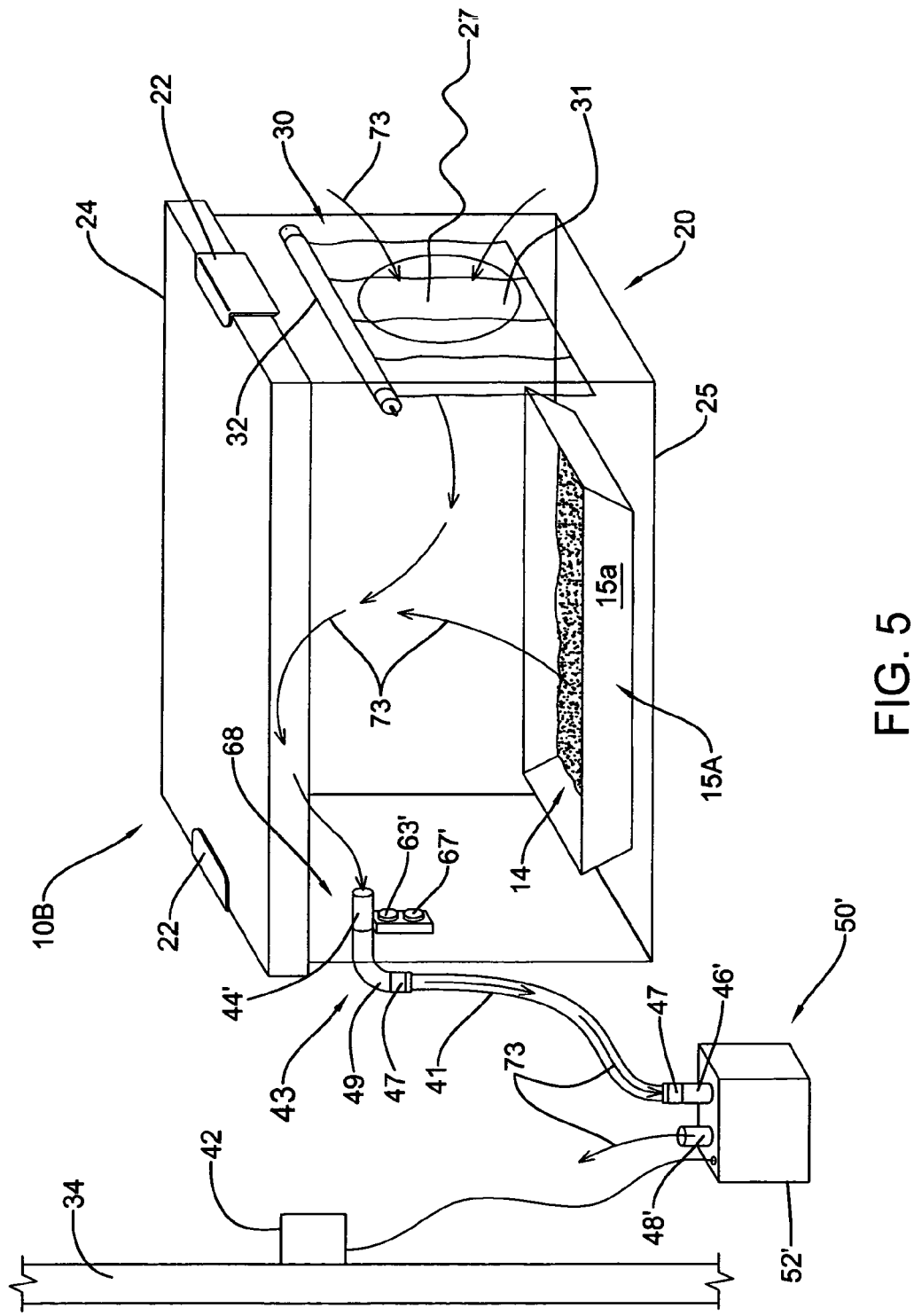
FIG. 5 is a perspective view of another embodiment of the present odor-removing trap system including an external air filter assembly having an internally positioned motion detector and LED module connected thereto.

With reference to FIG. 5, another embodiment of the present system, indicated generally at 10B, will now be described. In the embodiment shown in FIG. 5, a litter box 15A consisting only of a bottom tray 15a containing cat litter 14 is similarly disposed within enclosure assembly 20. Enclosure assembly 20 including lid member 24 and body member 25 are fabricated from a clear, engineered plastic such as polyurethane, polyvinylchloride or other suitable material and remain as described hereinabove.

In this embodiment of the present system, enclosure assembly 20 similarly includes an access opening 27 having a retaining gate assembly, indicated generally at 30, to prevent the spillage of cat litter from the enclosure 20 during use.

In this embodiment the present system 10B also includes an air filtering means including, but not limited to, the following structures. Still referring to FIG. 5 there is shown another embodiment of a filter assembly, indicated generally at 50'. Filter assembly 50' comprises a housing 52' which is free-standing and resides on the floor externally of the enclosure assembly 20. Housing 52' also includes an inlet 46' and an outlet 48' to permit the noxious gas mixture to flow through the filter assembly 50' in operation. As more clearly shown in FIG. 6, filter assembly 50' includes an activated charcoal filter element 55', a miniature brushless fan motor 54', an adjustable timer 61' and a battery pack 65'. It will be appreciated that a motion detector 63' and a LED 67' remain electrically connected with filter assembly 50', but have been removed from the housing 52' and positioned remotely within enclosure assembly 20. (FIG. 5).

More particularly, the present filter assembly 50' as shown in FIG. 5 includes a motion detector 63' and an LED 67' integrated within a detachable module, indicated generally at 68, (FIG. 7) that is installed within the interior of the enclosure assembly 20.

Figure 7:
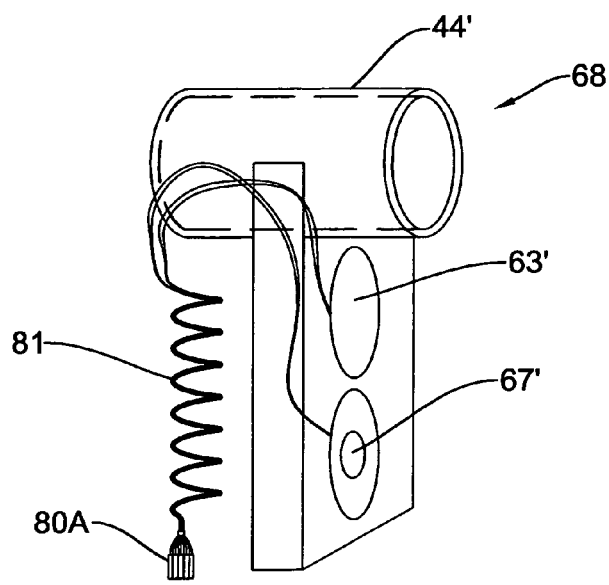
FIG. 7 is an enlarged perspective view of the motion detector/LED module used in combination with the external air filter assembly of FIG. 6.
Figure 6:
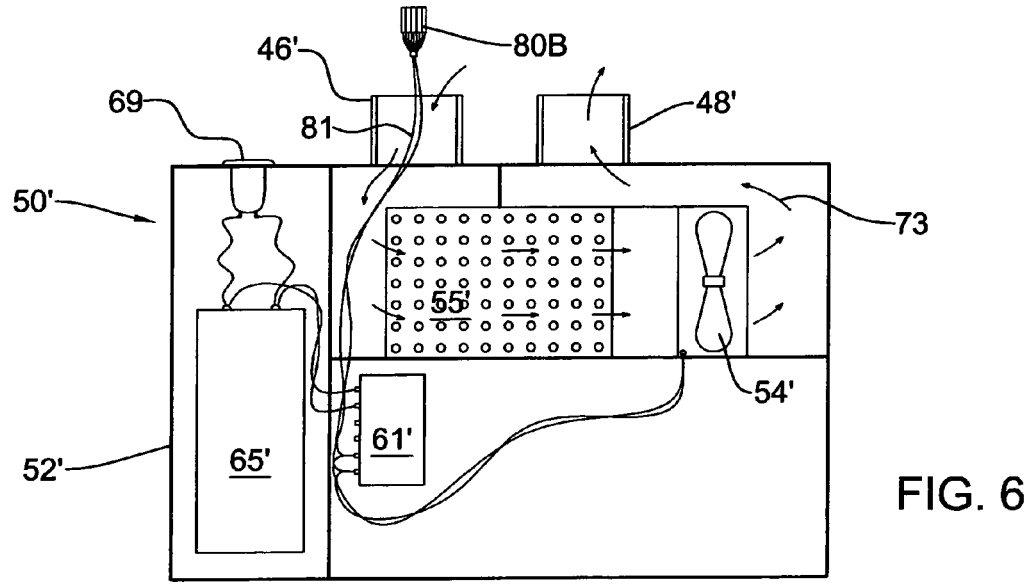
FIG. 6 is a diagrammatic view of the external air filter assembly of FIG. 5 showing the internal components and further details thereof.

As shown in FIG. 7 module 68 including motion detector 63' and LED 67' are electrically interconnected with timer 61' (FIG. 6) to limit operation thereof to a timed-cycle and to thereby extend the operating life of filter element 55'. A detachable connector plug 80A attached via electrical wiring 81 to motion detector 63' and LED 67' extends from module 68 through tubing 41 (FIG. 5) into housing 52' via inlet 46' to engage mating connector receptacle 80B (FIGS. 6 and 7). Module 68 also includes an integrally formed coupling 44' for attachment of the module to outlet port assembly 43 in the position shown in FIG. 5.

Since many commercially available motion detectors 63' and LEDs 67' are suitable for this purpose and well known to those skilled in the art, further detailed discussion of the same is not considered necessary.

Fan motor 54' within filter assembly 50' (FIG. 6) receives power for its operation from a power supply 42 (FIG. 5) electrically connected with the filter assembly via jack 69 (FIG. 6) that converts AC supplied by an electrical system into 12 Volts DC to operate the fan motor as described hereinabove. It will be appreciated that filter assembly 50' is also capable of operating solely with battery pack 65' in a battery mode. In such operating mode power supply 42 (FIG. 5) is unplugged from jack 69 (FIG. 6) and battery pack 65' provides power to operate filter assembly 50'.

Thus, the pathway that air and noxious gases follow when the present system 10B as shown in FIGS. 5-7 is utilized is that ambient air ingresses via opening 27 into the enclosure assembly 20, mixes with noxious gases emanating from the litter box 15A, is drawn through module 68 into outlet port assembly 43, passes into 50' filter assembly via inlet 46', is drawn through activated charcoal filter element 55' by fan motor 54', exits from housing 52' through outlet 48' to the exterior of enclosure assembly 20. Filtered air is delivered from filter assembly 50' into the ambient room air as shown by directional arrows 73 (FIG. 5) producing no perceptible odor.

As to any further discussion of the manner of usage and operation of the present system, the same should be apparent from the above description. However, various modifications to the disclosed embodiments will be readily apparent to those skilled in the art and are considered to be within the scope of the present invention.

Figure 8A:
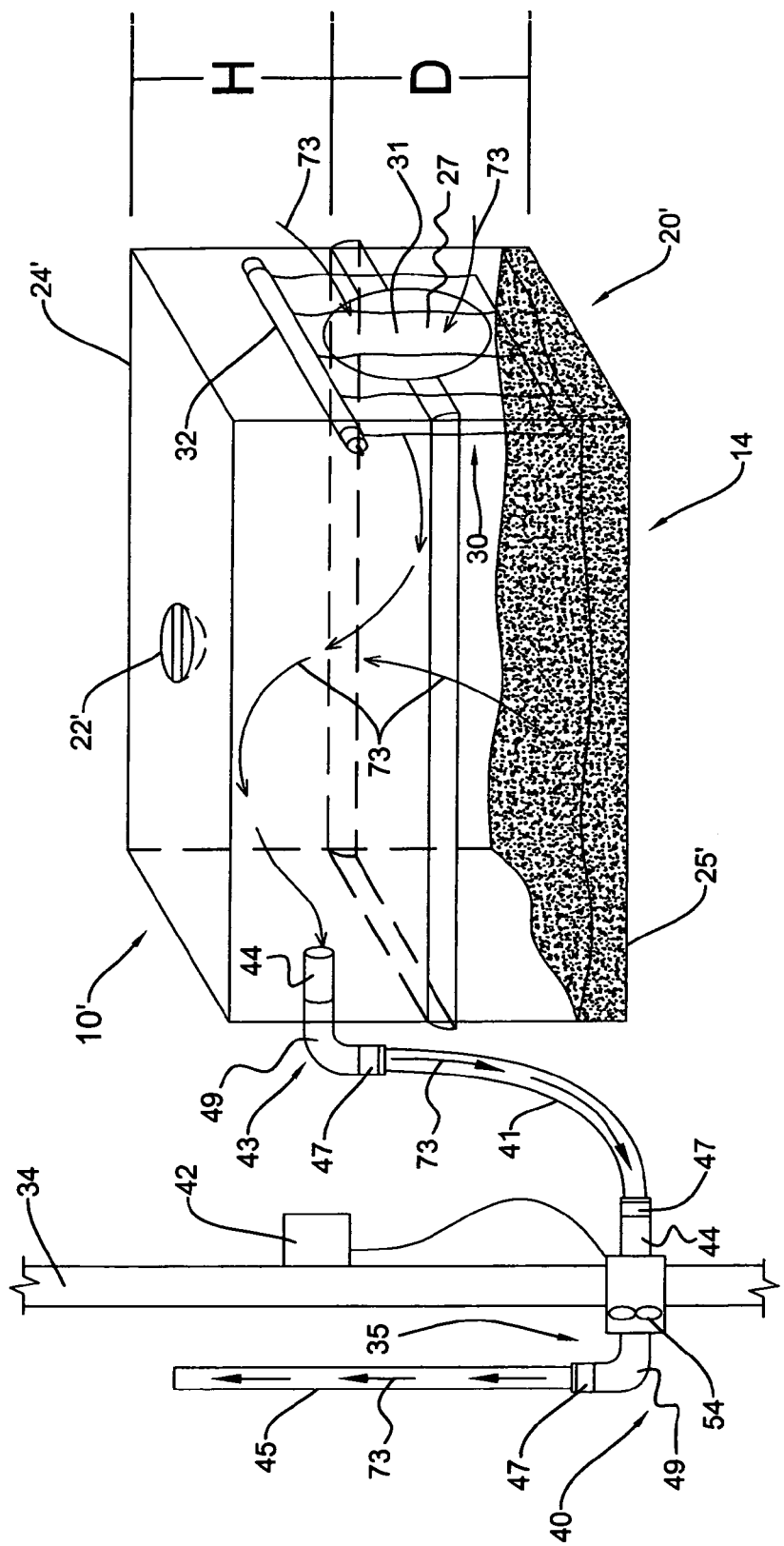
FIG. 8A is a perspective view of another embodiment of the present odor-removing trap system including a modified enclosure assembly that functions directly as a cat litter box and wherein an external exhaust conduit is utilized.
Figure 8B:
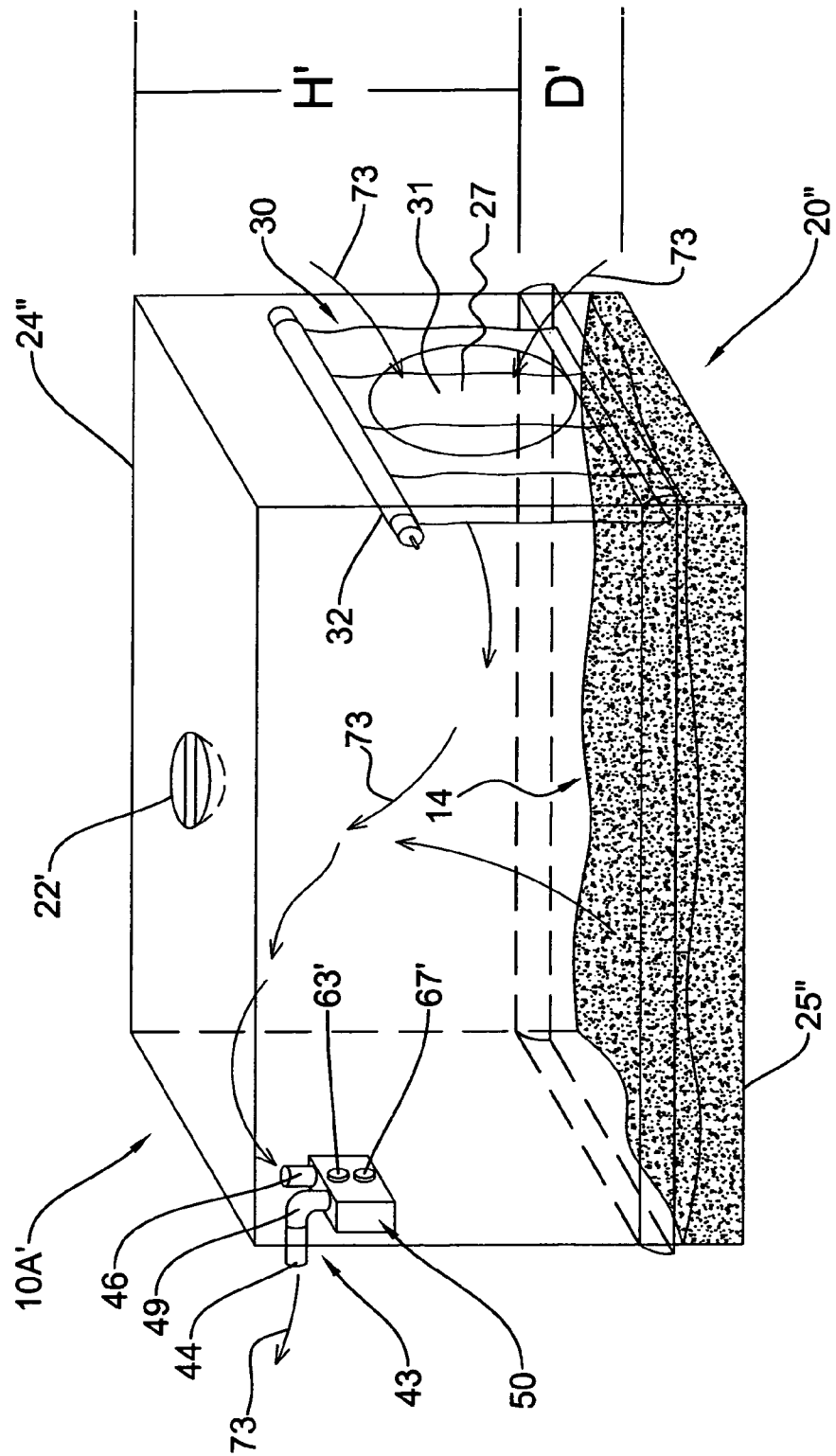
FIG. 8B is a perspective view of another embodiment of the present odor-removing trap system including a modified enclosure assembly that functions directly as a cat litter box and wherein an internal filter assembly is utilized.
Figure 9:
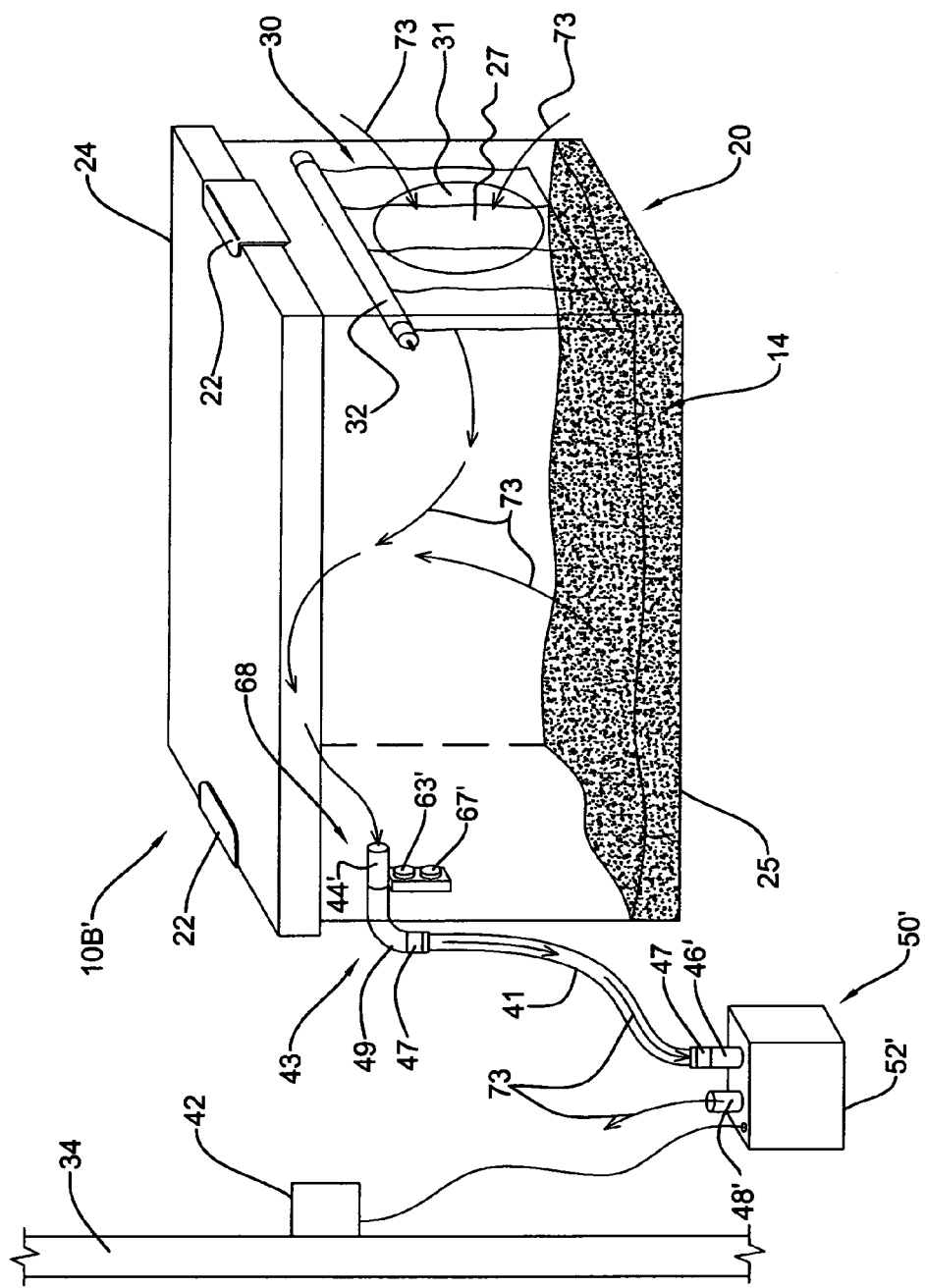
FIG. 9 is a perspective view of another embodiment of the present odor-removing trap system wherein the enclosure assembly functions directly as a cat litter box and wherein an external filter assembly is utilized with an internal motion detector/LED module.

For example, FIGS. 8A, 8B and 9 illustrate variations in the construction and use of the present trap system 10', 10A', 10B' respectively. In such embodiments the body members 25, 25', 25" are utilized to contain cat litter 14 directly therein instead of using a separate litter box 15, 15A as described hereinabove. As shown in FIGS. 8A and 8B the depth D, D' of body members 25', 25" and the corresponding vertical height H, H' of the lid members 24', 24" of modified enclosures 20', 20" respectively can be varied to contain cat litter 14 directly based on consumer preference. Lid members 24, 24" are provided with a modified handle 22' for the convenience of the user. The embodiments of the present system depicted in FIGS. 8A, 8B and 9 can be utilized with the exhaust system 40 described in relation to FIG. 1A or either filter assembly 50, 50' described in relation to FIGS. 2 and 5 respectively. In all other functional aspects such embodiments 10', 10A', 10B' of the present system are substantially the same as described hereinabove.

Figure 10:
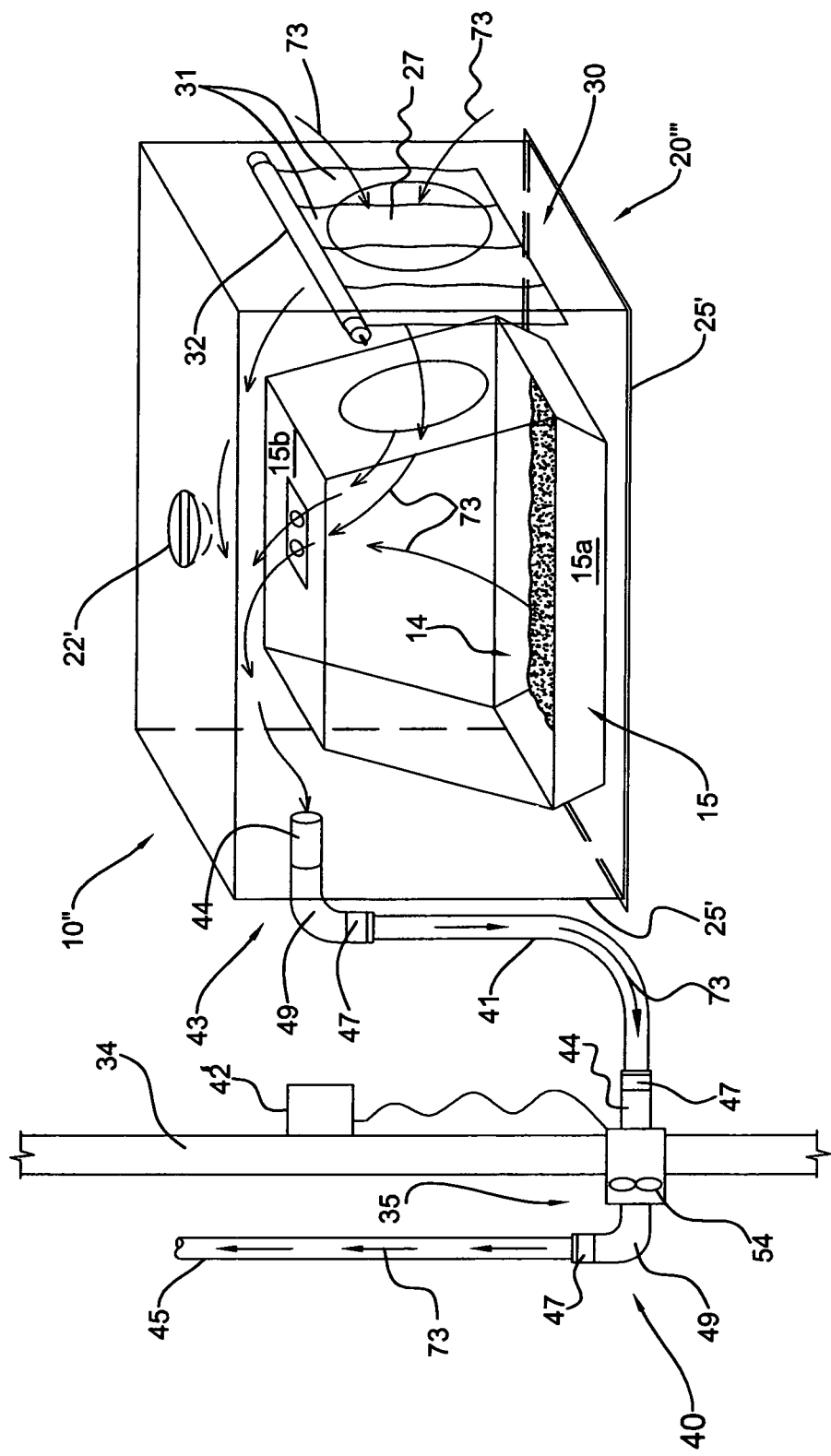
FIG. 10 is a perspective view of another embodiment of the present odor-removing trap system wherein a modified enclosure assembly without a lid member is inverted from the position shown in FIG. 1 and is utilized with an external exhaust line.
Figure 11:
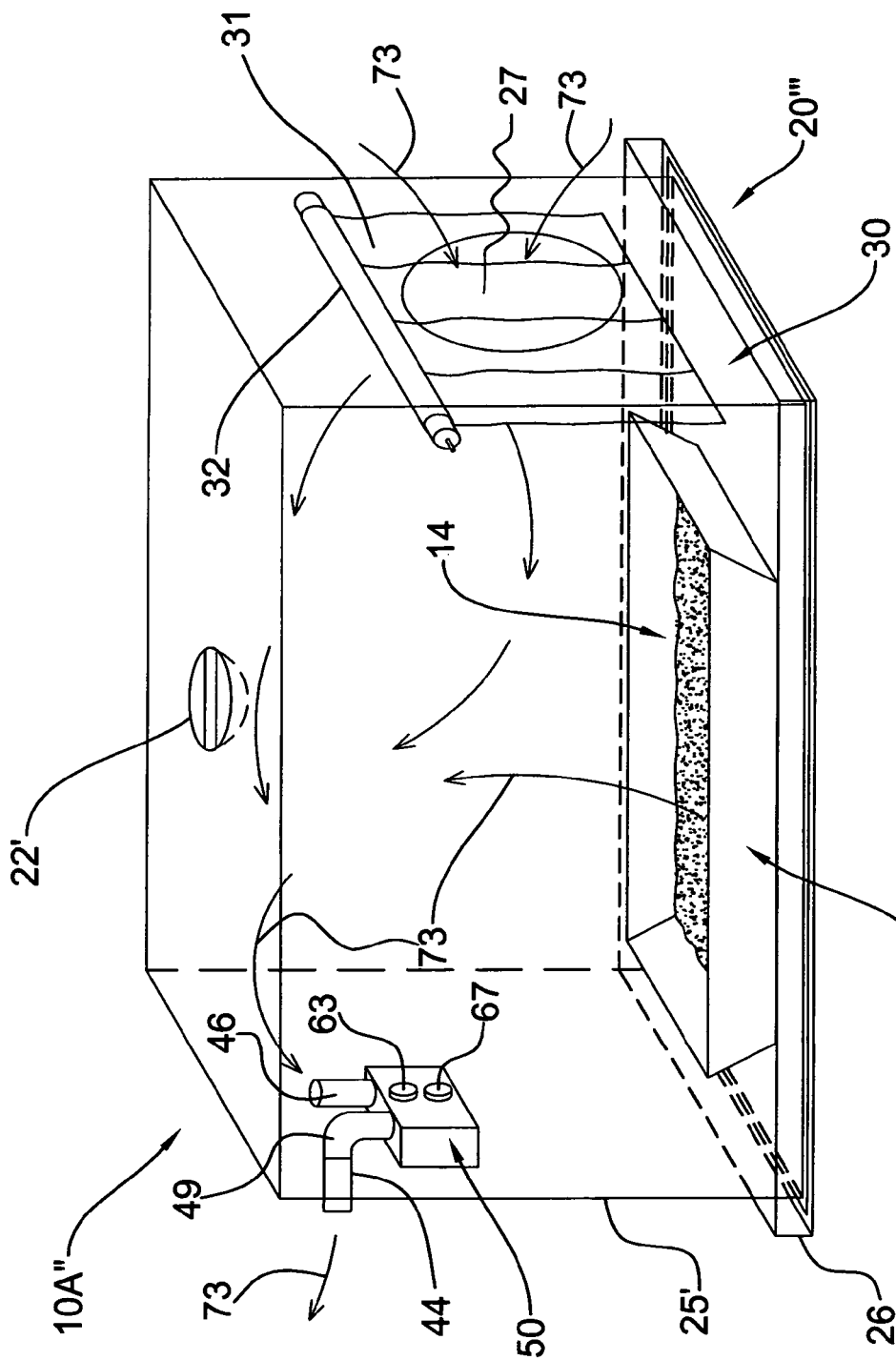
FIG. 11 is a perspective view of another embodiment of the present odor-removing trap system wherein a modified enclosure assembly without a lid member is inverted from the position shown in FIG. 1 being utilized with an internal filter assembly and further including a bottom pan.
Figure 12:
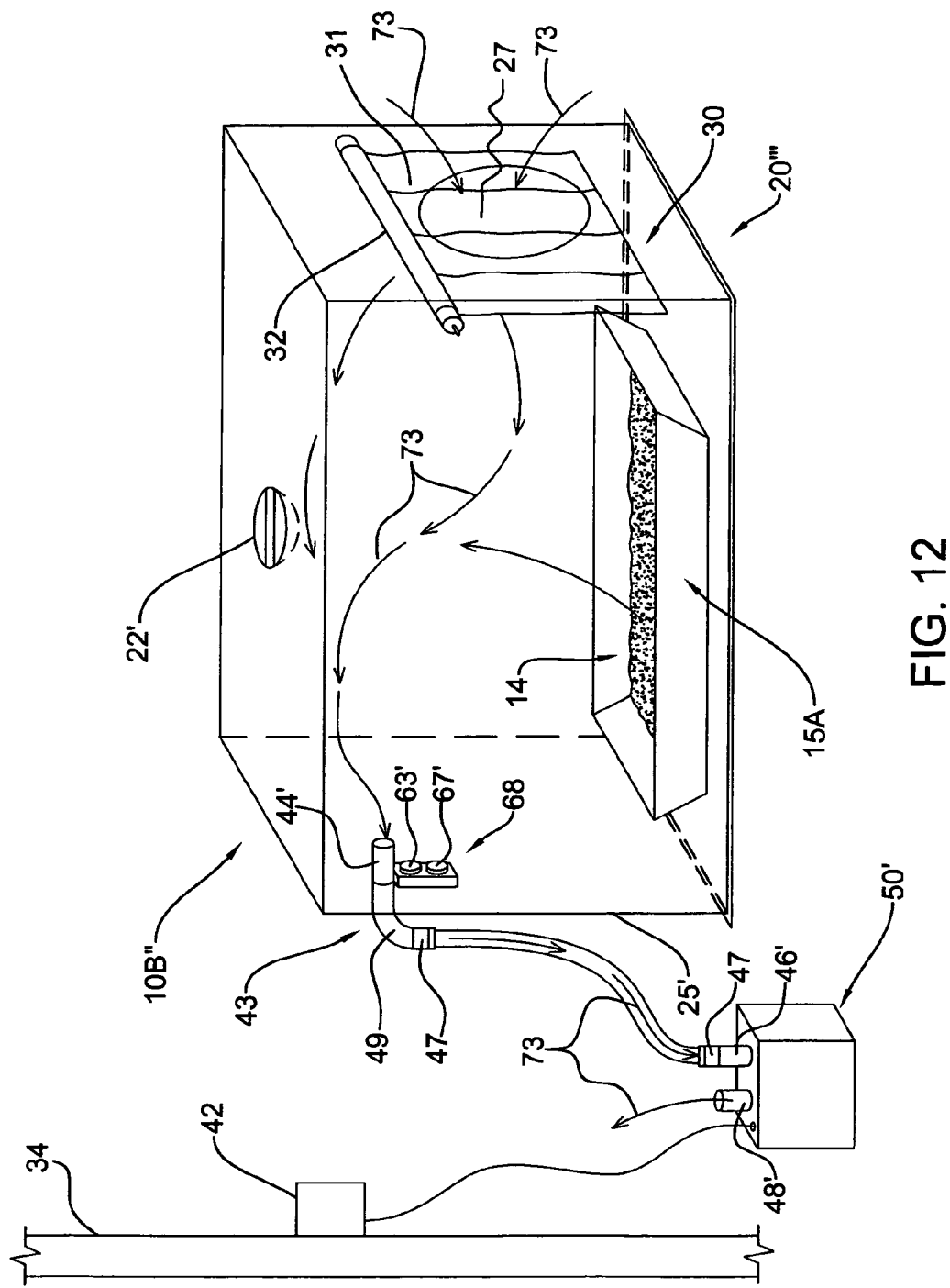
FIG. 12 is a perspective view of another embodiment of the present odor-removing trap system wherein a modified enclosure assembly without a lid member is inverted from the position shown in FIG. 1 and is utilized with an external filter assembly having an internal motion detector/LED module.

FIGS. 10, 11 and 12 illustrate further variations in the use and construction of other embodiments of the present trap system 10", 10A", 10B" respectively. In such embodiments it can be seen that a modified enclosure 20''' comprised of a body member 25' without a lid member 24 is inverted to cover a separate litter box 15, 15A wherein cat litter 14 is contained. An optional floor pan 26 (FIG. 11) fabricated from clear, engineered plastic such as polyurethane, polyvinylchloride or other suitable material and configured to loosely fit enclosure assembly 20''' to contain any overflow of cat litter 14 can be provided for the convenience of the user.

The embodiments of the present trap system 10", 10A", 10B" depicted in FIGS. 10, 11 and 12 respectively can be utilized with exhaust system 40 (FIG. 10) described in relation to FIG. 1A or either filter assembly 50, 50' (FIGS. 11 and 12) respectively described in relation to FIGS. 2 and 5. In all other functional aspects such embodiments 10", 10A", 10B" of the present system are substantially the same as described hereinabove.

Figure 13:
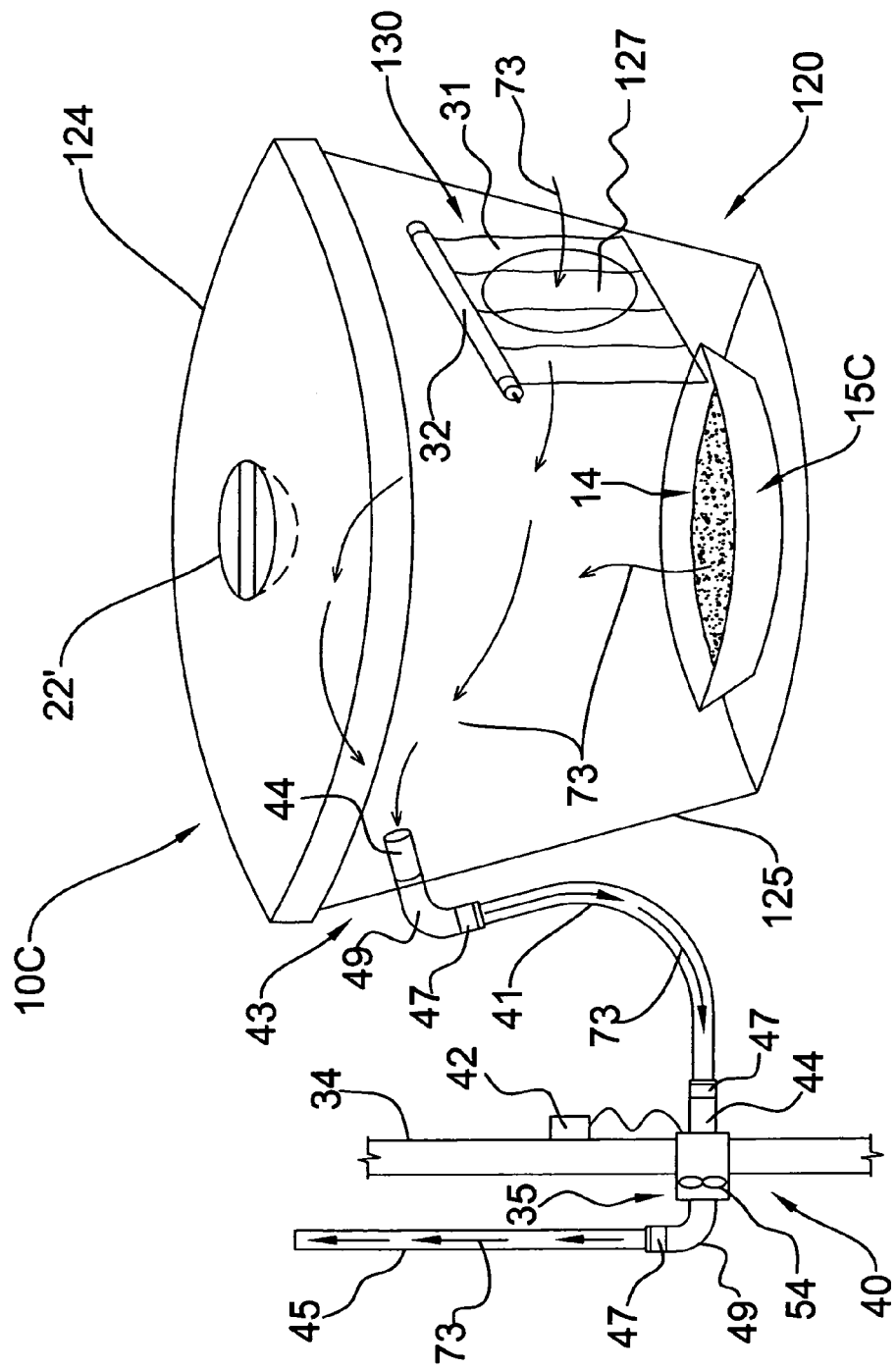
FIG. 13 is a perspective view of another embodiment of the present odor-removing trap system having a cylindrical enclosure assembly wherein an external exhaust conduit is utilized.
Figure 14:
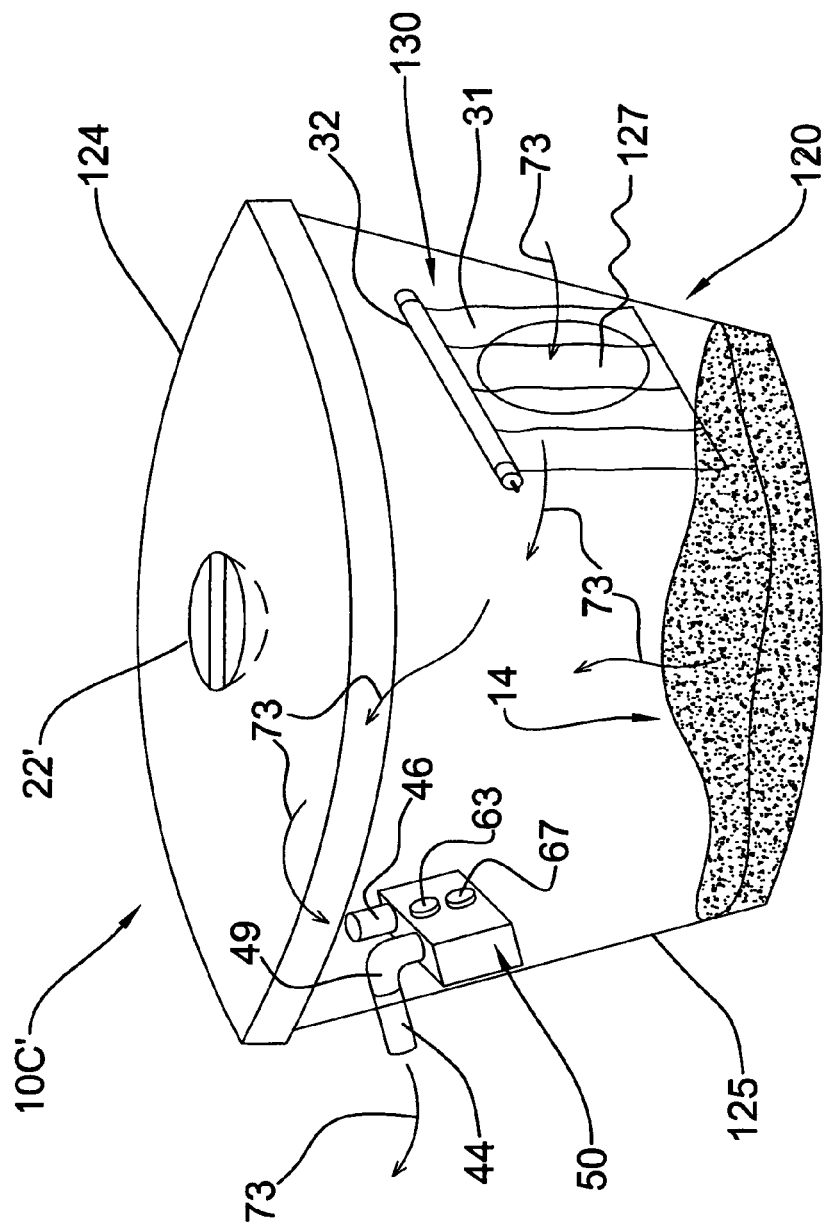
FIG. 14 is a perspective view of another embodiment of the present odor-removing trap system having a cylindrical enclosure assembly wherein an internal filter assembly is utilized.
Figure 15:
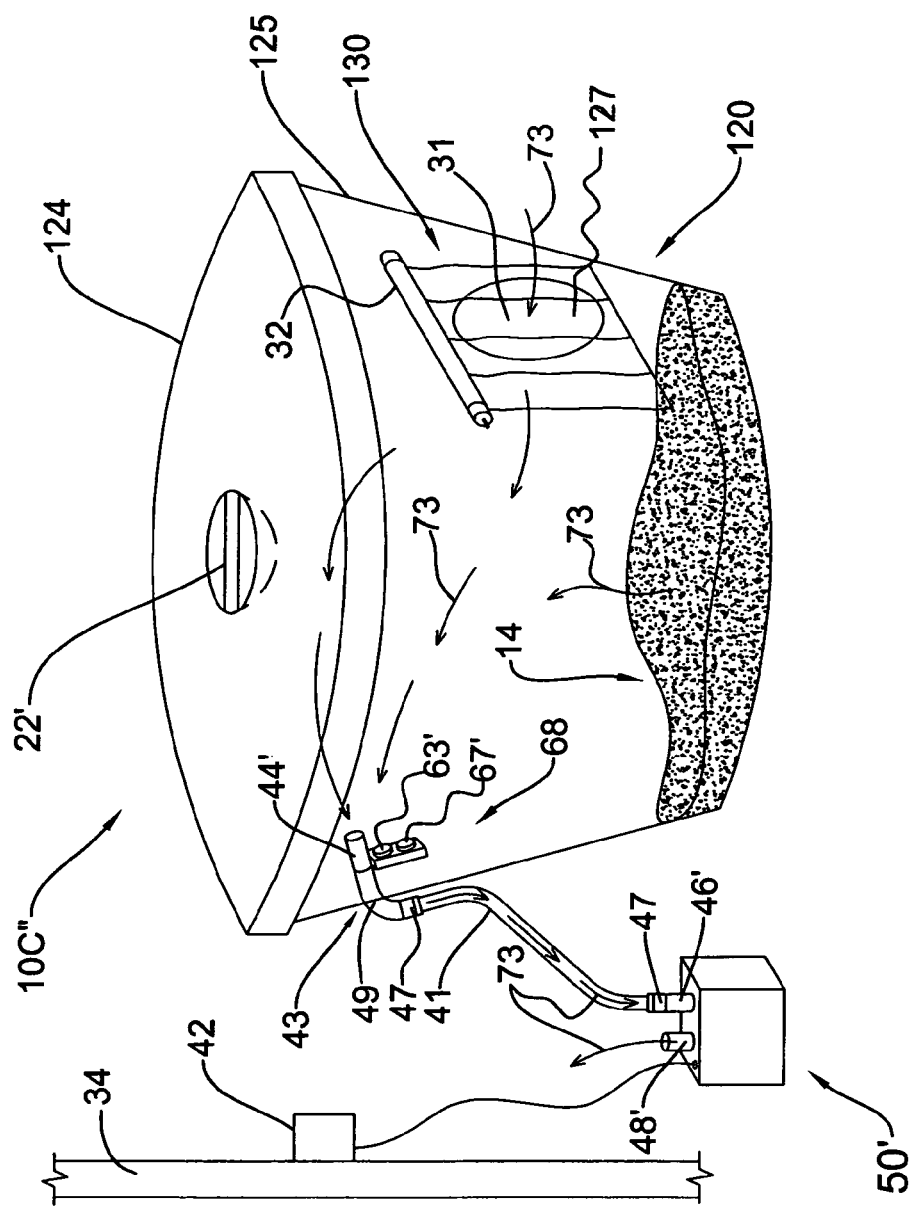
FIG. 15 is a perspective view of another embodiment of the present odor-removing trap system having a cylindrical enclosure assembly wherein an external filter assembly is utilized with an internal motion detector/LED module.

FIGS. 13, 14 and 15 illustrate further variations in the construction of alternative embodiments of the present system 10C, 10C', 10C" respectively. In such embodiments it can be seen that a modified cylindrical enclosure 120 comprised of a generally cylindrical body member 125 including a mating circular lid member 124 constructed of a clear thermoplastic material are provided to contain a separate litter box 15C (FIG. 13) or, alternatively, cat litter 14 can be received directly in body member 125 as shown in FIGS. 14 and 15. Enclosure assembly 120 also includes an access opening 127 having a flexible gate assembly, indicated generally at 130, as described hereinabove being positioned adjacent to the opening 127 within enclosure assembly 120 to prevent the spillage of cat litter from the enclosure 120 during use.

The embodiments of the present system 10C, 10C', 10C" depicted in FIGS. 13, 14 and 15 respectively can be utilized with the exhaust system 40 (FIG. 13) described in relation to FIG. 1A or either filter assembly 50, 50' (FIGS. 14 and 15) respectively described in relation to FIGS. 2 and 5. In all other functional aspects such embodiments of the present system 10C, 10C', 10C" are substantially the same as described hereinabove.

Figure 16:
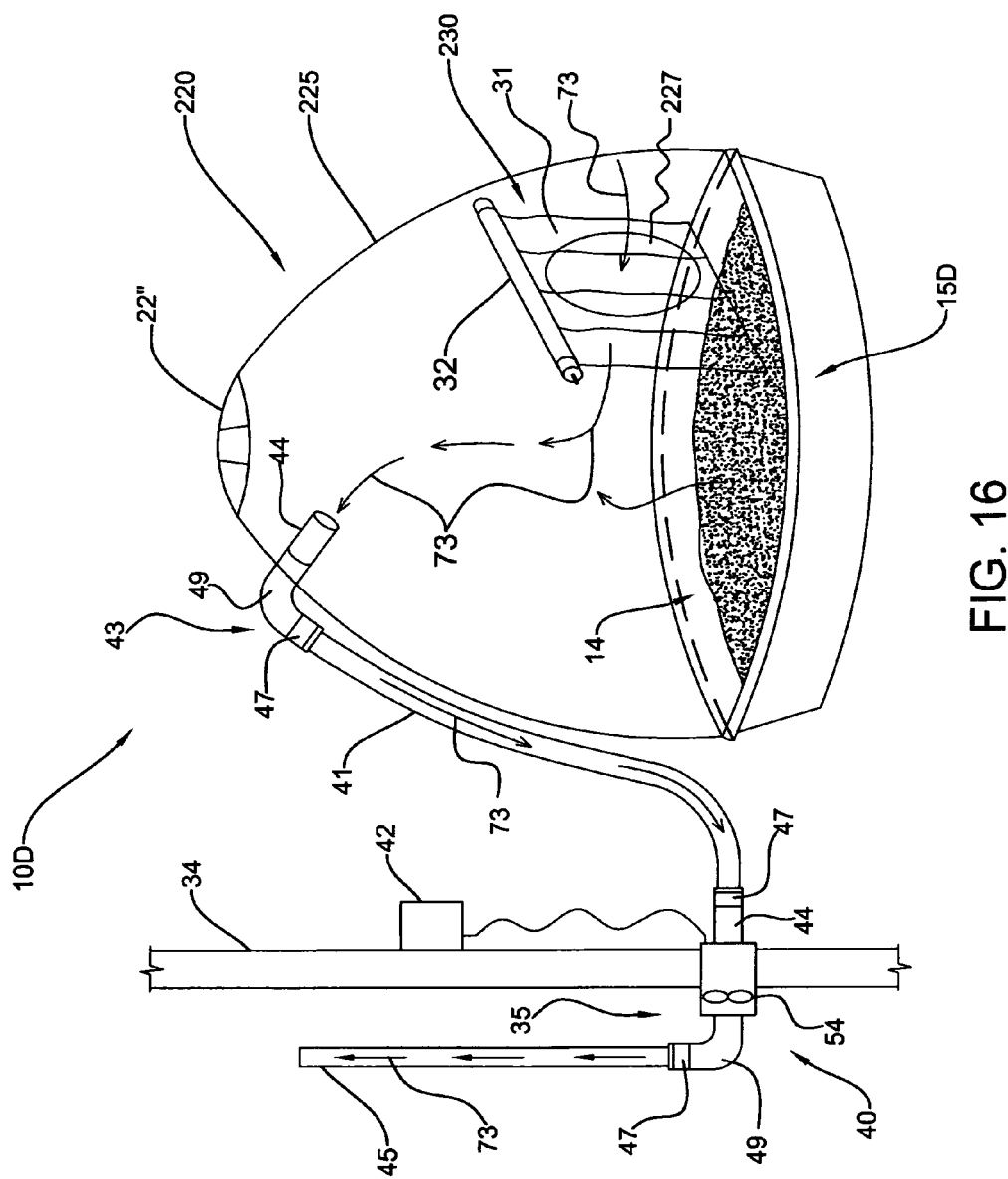
FIG. 16 is a perspective view of another embodiment of the present odor-removing trap system including a modified, dome-shaped enclosure assembly wherein an external exhaust line is utilized.
Figure 17:
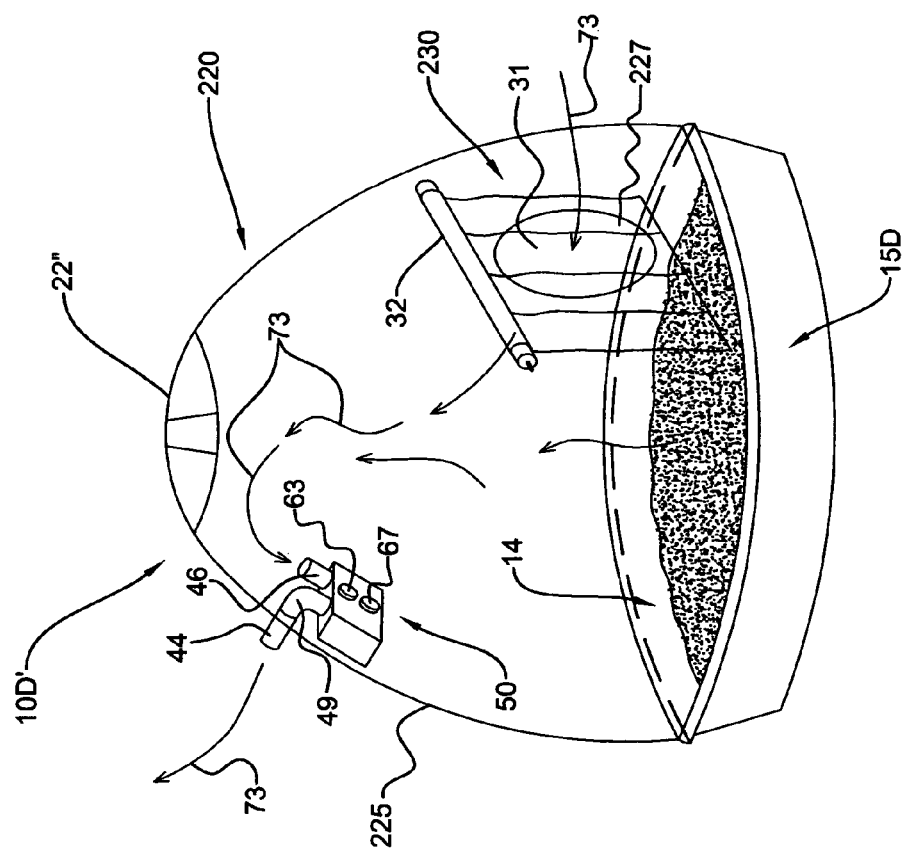
FIG. 17 is a perspective view of another embodiment of the present odor-removing trap system including a modified, dome-shaped enclosure assembly wherein an internal filter assembly is utilized.
Figure 18:
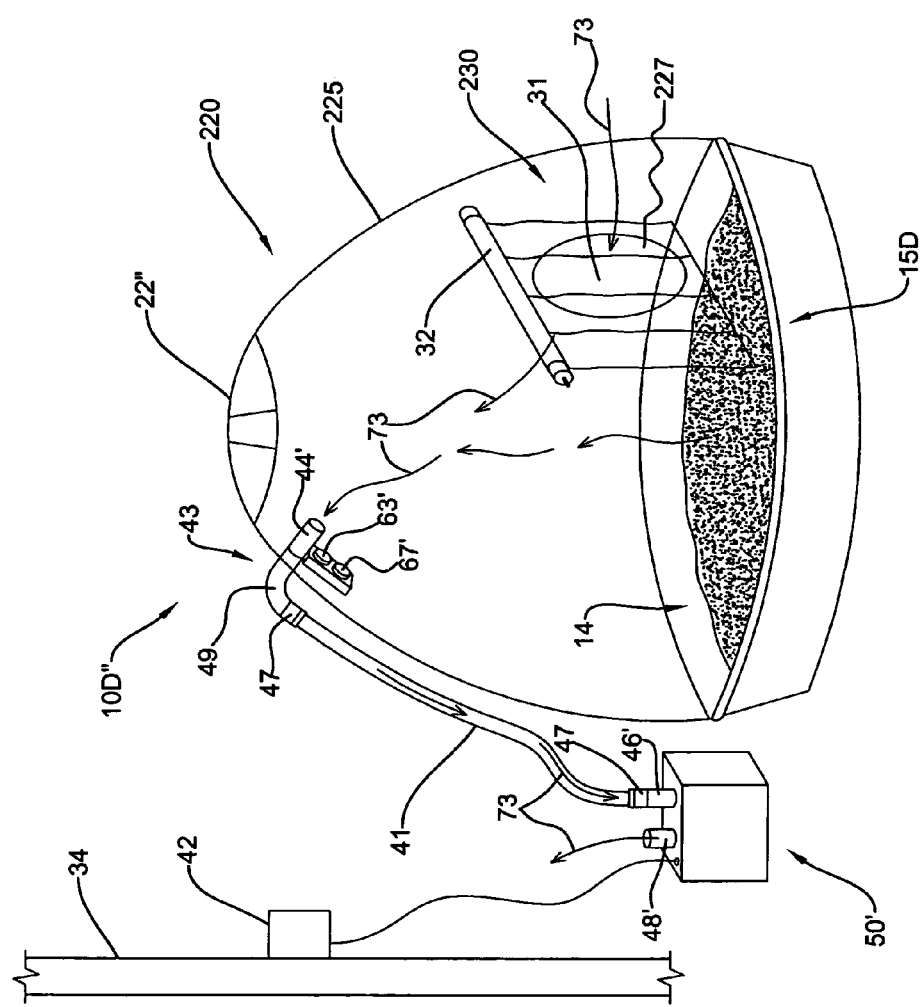
FIG. 18 is a perspective view of another embodiment of the present odor-removing trap system including a dome-shaped enclosure assembly wherein an external filter assembly is utilized with an internal motion detector module.

FIGS. 16, 17 and 18 illustrate further variations in the construction of other embodiments of the present trap system 10D, 10D', 10D" respectively. In such embodiments it can be seen that a modified enclosure assembly 220 constructed of a clear thermoplastic material including a dome-shaped lid member 225 is provided, which is applied directly on top of a litter box 15D wherein cat litter 14 is contained. Enclosure assembly 220 also includes an access opening 227 having a flexible gate assembly, indicated generally at 230, as described hereinabove being positioned adjacent to the opening 227 within enclosure assembly 220 to prevent the spillage of cat litter 14 during use by the cat.

The embodiments of the present trap system 10D, 10D', 10D" depicted in FIGS. 16, 17 and 18 respectively can be utilized with exhaust system 40 (FIG. 16) described in relation to FIG. 1A or either filter assembly 50, 50' (FIGS. 17 and 18) respectively described in relation to FIGS. 2 and 5. In all other functional aspects such embodiments of the present system 10D, 10D', 10D" are substantially the same as described hereinabove.

Figure 19:
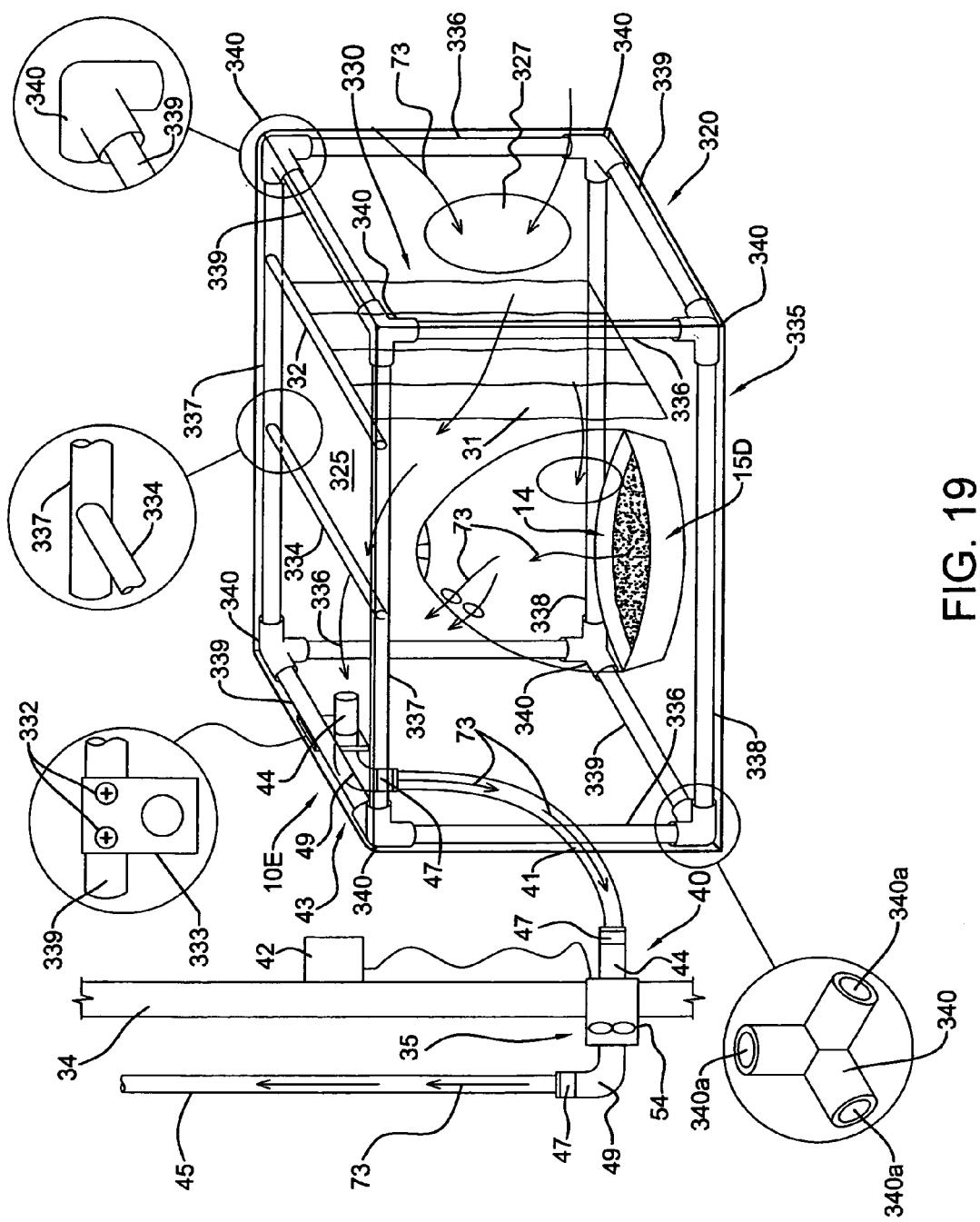
FIG. 19 is a perspective view of another embodiment of the present odor-removing trap system (with detail views) including a tent-like enclosure assembly wherein an external exhaust conduit is utilized.
Figure 20:
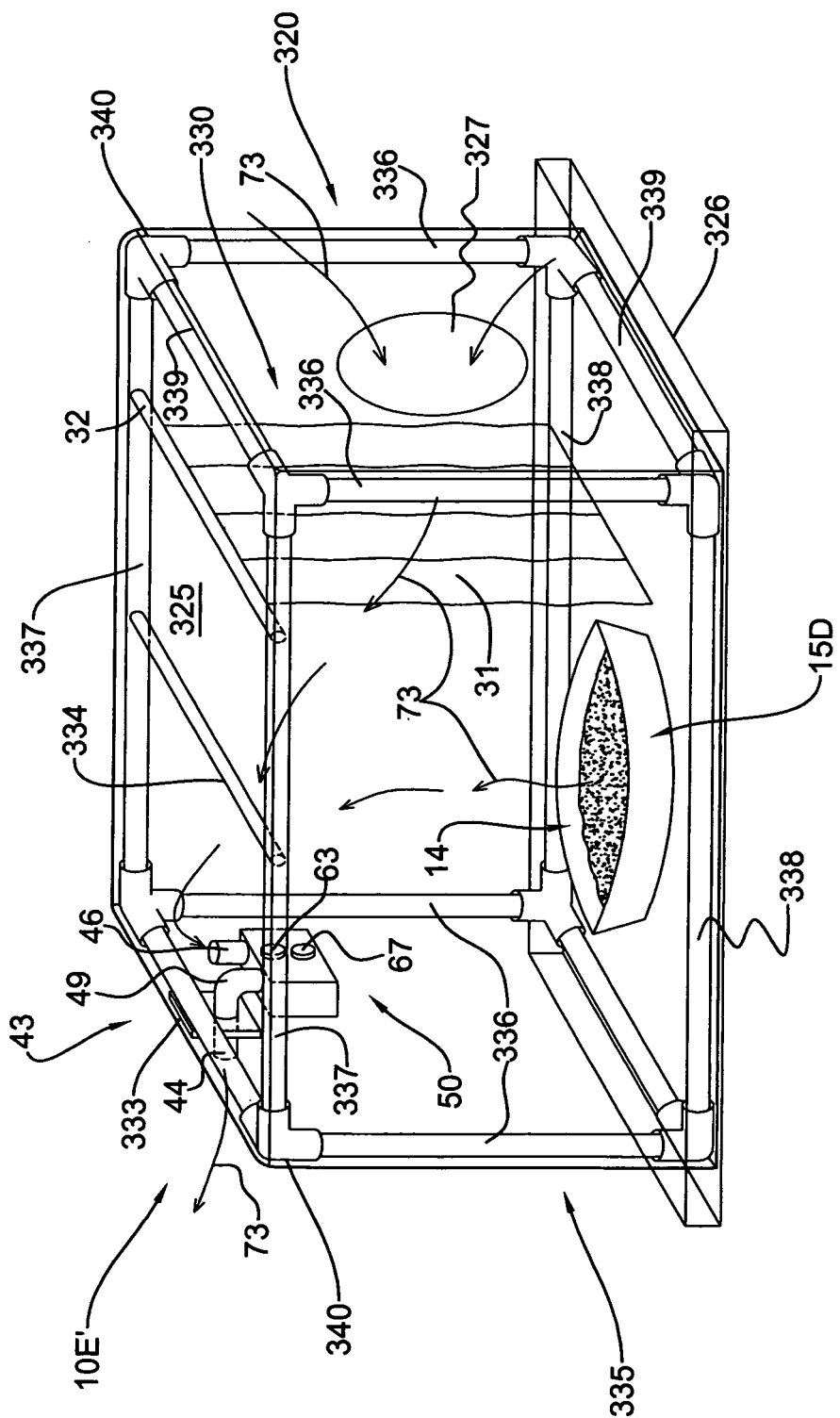
FIG. 20 is a perspective view of another embodiment of the present odor-removing trap system including a tent-like enclosure assembly wherein an internal filter assembly is utilized and further including a bottom pan.
Figure 21:
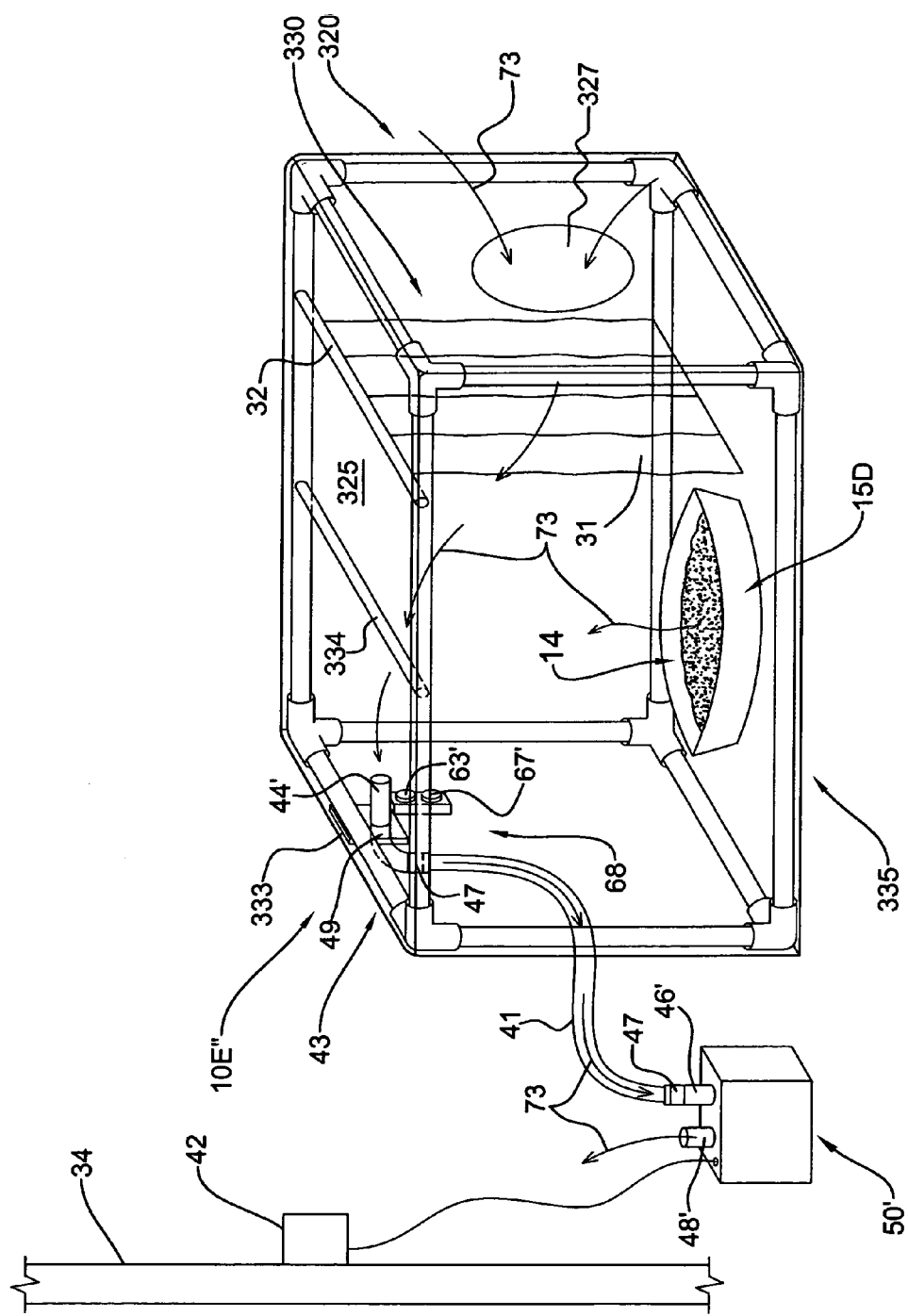
FIG. 21 is a perspective view of another embodiment of the present odor-removing trap system including a tent-like enclosure assembly wherein an external filter assembly is utilized with an internal motion detector/LED module.

FIGS. 19, 20 and 21 illustrate further variations in the construction of other embodiments of the present trap system 10E, 10E', 10E" respectively. In such embodiments it can be seen that a modified enclosure 320 comprised of a flexible, tent-like cover 325 is mounted on a supporting frame, indicated generally at 335, wherein a litter box 15D is disposed. The present trap systems 10E, 10E', 10E" can be utilized with substantially any available litter box on the market.

Enclosure assembly 320 includes an access opening 327 having a flexible gate assembly, indicated generally at 330, positioned within enclosure assembly 320 adjacent to the opening 327 to prevent the spillage of cat litter 14 from the enclosure assembly during use. Gate assembly 330 is pivotally mounted between opposed frame members 337 by means of support rod 32 (FIG. 1B) as shown. In this embodiment cover member 325 is constructed of clear or translucent sheet plastic or a synthetic fabric material such as nylon or other suitable material for this purpose.

Supporting frame 335 is comprised of interchangeable, vertical post members 336, a pair of upper side frame members 337, a pair of lower side frame members 338 and interchangeable end members 339. A plurality of interchangeable corner brackets 340 each having receptacles 340a formed therein at 90 degree angles receive frame members 336, 337, 338 and 339 therein during assembly. A cross-member 334 is provided, which extends between upper side frame members 337 as shown (FIG. 19) to add support for cover 325. Members 336, 337, 338, 339 and brackets 340 are fabricated from tubular plastic, metal or other suitable material being dimensioned to slip-fit condition to be conveniently assembled by the user to provide a supporting frame 335 whereon cover member 325 is disposed as shown. An optional floor pan 326 (FIG. 20) fabricated from any suitable plastic material and configured to loosely fit enclosure 320 to contain any overflow of cat litter 14 is provided for the convenience of the user.

The embodiments of the present trap system 10E, 10E', 10E" depicted in FIGS. 19, 20 and 21 respectively can be utilized with the exhaust system 40 (FIG. 19) described in relation to FIG. 1A or either filter assembly 50, 50' (FIGS. 20 and 21) respectively described in relation to FIGS. 2 and 5. In such embodiments of the present system, a mounting bracket 333 (FIG. 19) is attached to an upper end member 339 by fasteners 332 and/or an adhesive to provide a stable mounting surface for attachment of the exhaust system 40 (FIG. 19) or either filter assembly 50, 50' (FIGS. 20 and 21) respectively. In all other functional aspects such embodiments of the present system 10E, 10E', 10E" are substantially the same as described hereinabove.

Figure 22:
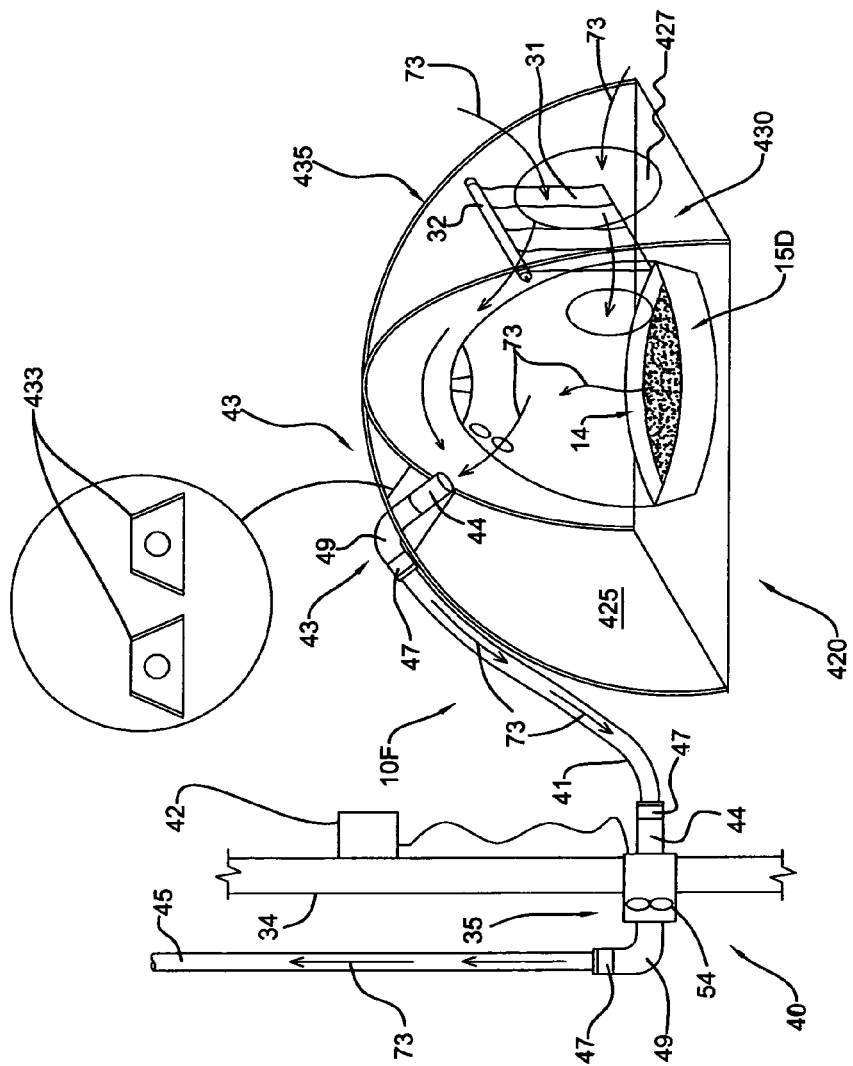
FIG. 22 is a perspective view of another embodiment of the present odor-removing trap system including a modified, tent-like enclosure assembly wherein an external exhaust conduit is utilized.
Figure 23:
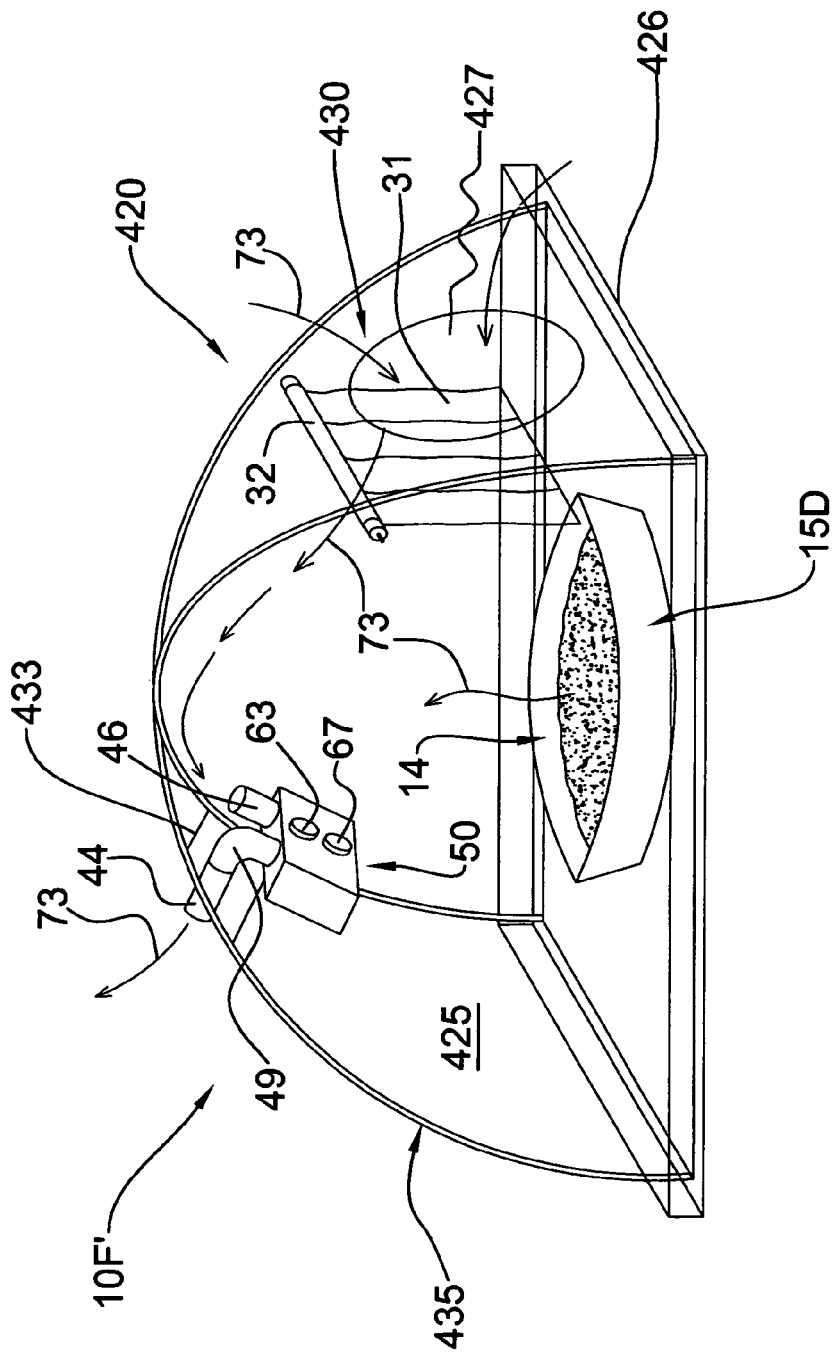
FIG. 23 is a perspective view of another embodiment of the present odor-removing trap system including a modified, tent-like enclosure assembly wherein an internal filter assembly is utilized and further including a bottom pan.
Figure 24:
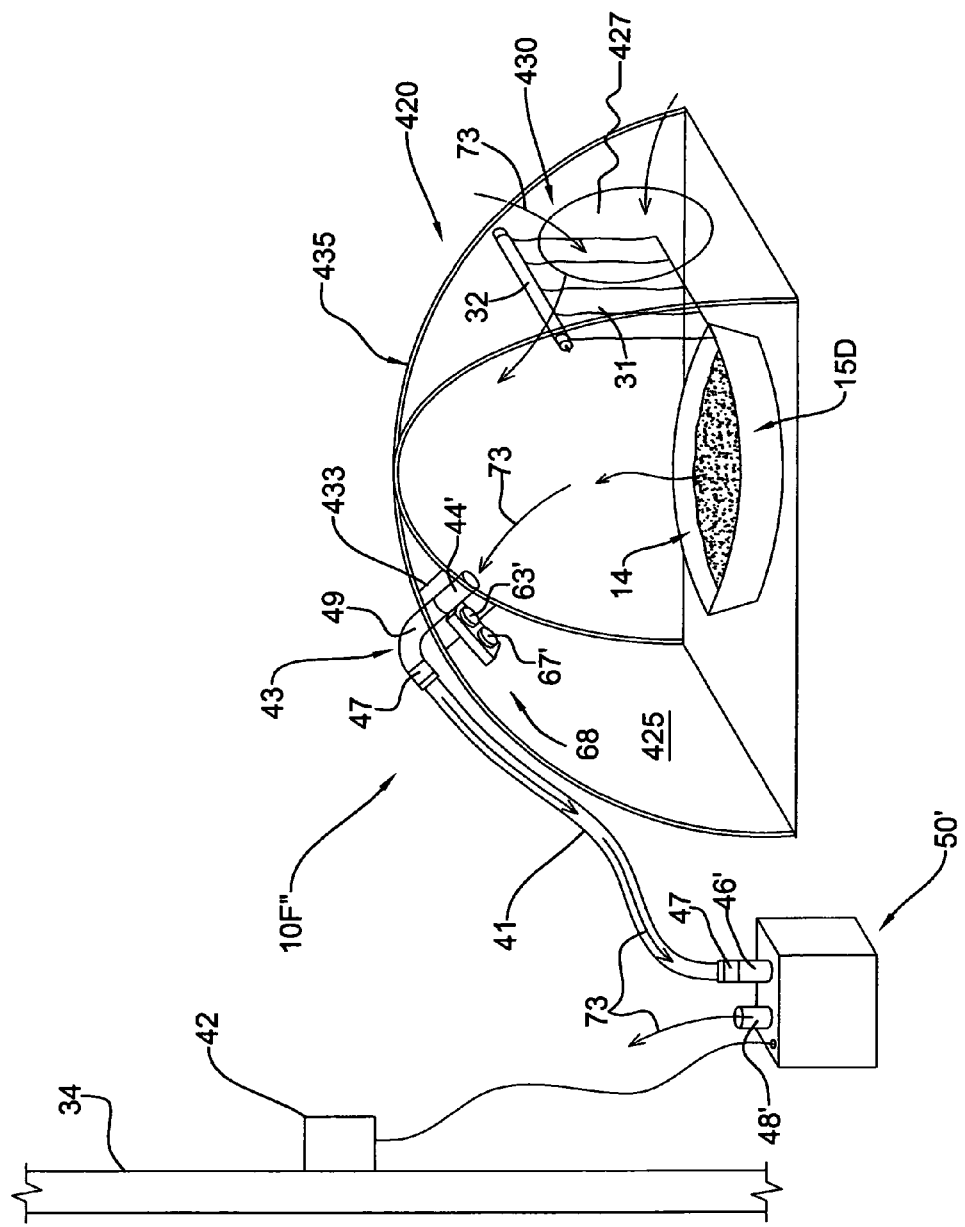
FIG. 24 is a perspective view of another embodiment of the present odor-removing trap system including a modified, tent-like enclosure assembly wherein an external filter assembly is utilized with an internal motion detector module.

FIGS. 22, 23 and 24 illustrate further variations in the construction of other tent-like embodiments of the present odor-removing trap system 10F, 10F', 10F" respectively. In such embodiments it can be seen that a generally pyramidal, tent-like enclosure 420 is comprised of a flexible cover 425 that is supported by a supporting frame 435 including resilient plastic rods or metal (not shown) captured within the cover along the peripheral edges thereof. A cat litter box 15D is disposed within cover 425 as shown. Enclosure assembly 420 also includes an access opening 427 having a flexible gate assembly, indicated generally at 430, positioned within enclosure assembly 420 adjacent opening 427 to prevent the spillage of cat litter 14 during use. Gate assembly 430 is pivotally mounted adjacent opening 427 by means of support rod 32 as shown.

In such embodiments cover member 425 is constructed of clear or translucent sheet plastic or other synthetic fabric suitable for this purpose.

An optional floor pan 426 (FIG. 23) fabricated from any suitable plastic material and configured to loosely fit enclosure 420 to contain any overflow of cat litter 14 is provided for the convenience of the user.

The embodiments of the present trap system 10F, 10F', 10F" depicted in FIGS. 22, 23 and 24 respectively can be utilized with exhaust system 40 (FIG. 22) described in relation to FIG. 1A or either filter assembly 50, 50' (FIGS. 23 and 24) respectively described in detail in relation to FIGS. 2 and 5. In such embodiments of the present system, reinforcing adapters 433 (FIG. 22) are attached to the inner and outer surfaces of cover 425 to provide a stable mounting surface for attachment of the exhaust system 40 (FIG. 22) or either filter assembly 50, 50' (FIGS. 23 and 24) respectively. In all other functional aspects such embodiments of the present system 10F, 10F', 10F" are substantially the same as described hereinabove.

Figure 25:
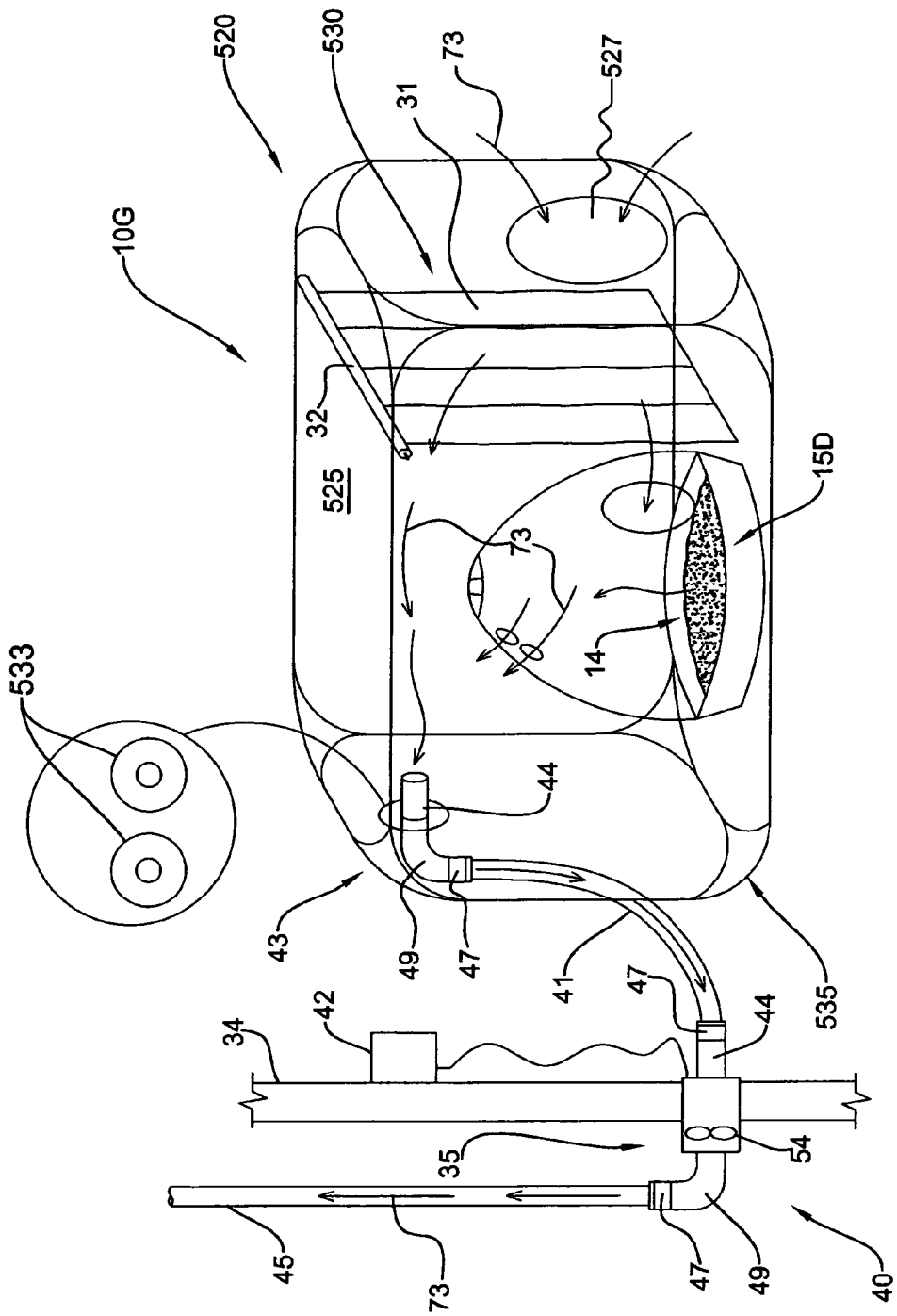
FIG. 25 is a perspective view of another embodiment of the present odor-removing trap system including a collapsible, cuboid enclosure assembly wherein an external exhaust conduit is utilized.
Figure 26:
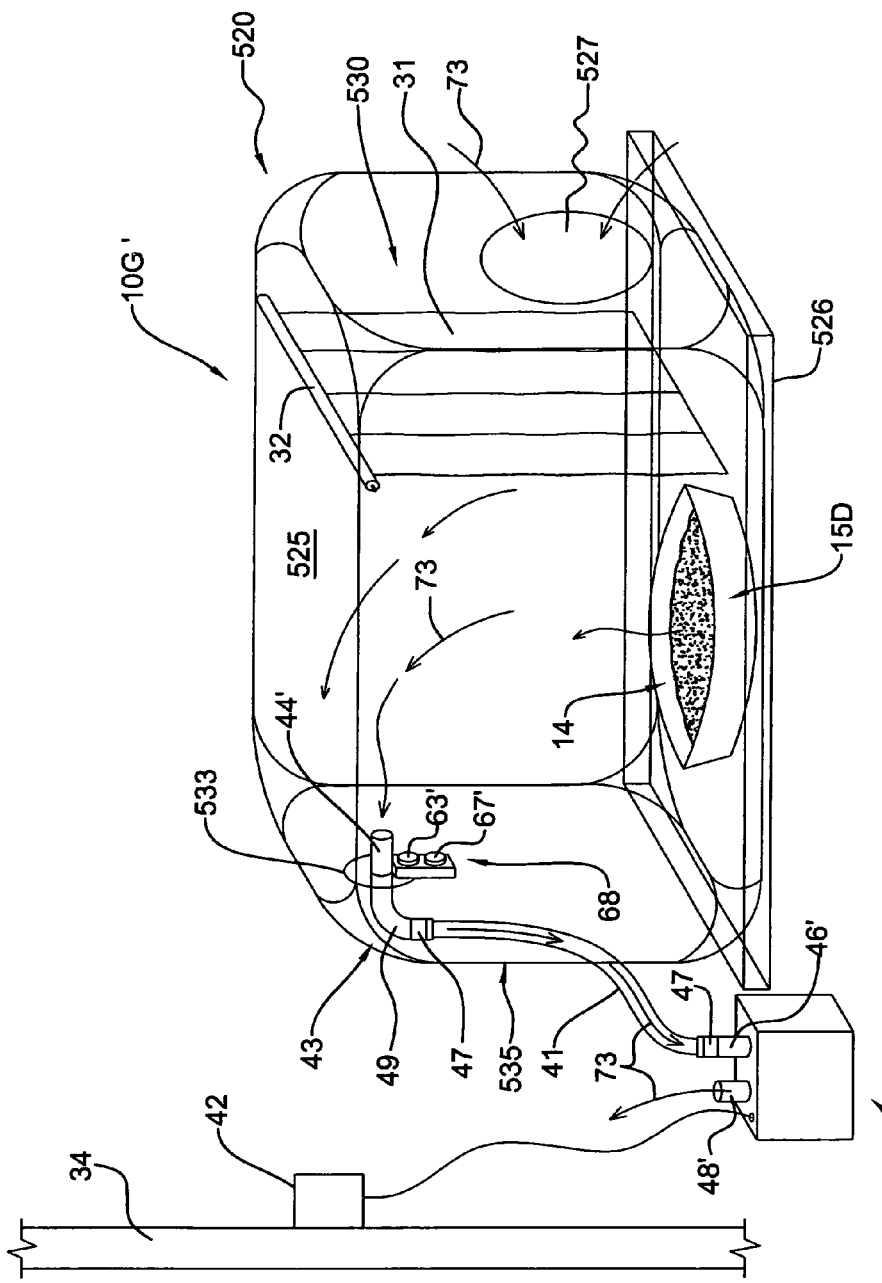
FIG. 26 is a perspective view of another embodiment of the present odor-removing trap system including a collapsible, cuboid enclosure assembly wherein an external filter assembly is utilized with an internal motion detector/LED module.

FIGS. 25 and 26 illustrate further variations in the construction of other embodiments of the present system 100, 100' respectively. In such embodiments it can be seen that a collapsible enclosure 520 is comprised of a flexible, tent-like cover 525, which is supported by a supporting frame 535 including resilient metal rods (not shown) captured within the cover by stitching along the peripheral edges thereof in a known manner. A cat litter box 15D is disposed within cover 525 as shown. Enclosure assembly 520 also includes an access opening 527 having a flexible gate assembly, indicated generally at 530, positioned within enclosure assembly 520 adjacent opening 527. Gate assembly 530 is pivotally mounted adjacent opening 527 by means of support rod 32 as shown. An optional floor pan 526 (FIG. 26) fabricated from any suitable plastic material and configured to loosely fit enclosure assembly 520 to contain any overflow of cat litter 14 can be provided for the convenience of the user.

As shown in FIGS. 25 and 26 cover member 525 is constructed of clear or translucent sheet plastic or other fabric material suitable for this purpose.

The embodiments of the present trap system 100, 100' depicted in FIGS. 25 and 26 respectively can be utilized with the exhaust system 40 (FIG. 25) described in relation to FIG. 1A or filter assembly 50' (FIG. 26) described in detail in relation to FIG. 5. In such embodiments of the present trap system, reinforcing adapters 533 (FIG. 25) are attached to the inner and outer surfaces of cover 525 to provide a stable mounting means for attachment of the exhaust system 40 (FIG. 25) or filter assembly 50' (FIG. 26). In all other functional aspects such embodiments of the present system 100, 10G' are substantially the same as described hereinabove.

Although not specifically illustrated in the drawings, it should be understood that additional equipment and structural components will be provided as necessary and that all of the components described above are arranged and supported in an appropriate fashion to form a complete and operative Odor-Removing Trap System for Cat Litter Boxes incorporating features of the present invention.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention. The scope of the present invention is defined by the appended claims.

What is claimed is:

1. An odor-removing trap system for cat litter boxes comprising:
   an enclosure assembly including an entry opening, the enclosure assembly further comprising a body member having an airtight gas trap formed therein, wherein the gas trap is defined by a lid member disposed in closing relation to the body member for collecting noxious gases emanating from cat litter contained therein;
   an outlet port assembly disposed in fluid communication with said enclosure assembly, wherein the outlet port assembly provides a pathway for egress of the noxious gases;
   a brushless fan motor disposed in fluid communication with the outlet port assembly, wherein the brushless fan motor is integrated within a detachable air filtration assembly including an activated charcoal filter element for absorption of the noxious gases, wherein the air filtration assembly further comprises a timer electrically interconnected to the brushless fan motor, wherein operation of the brushless fan motor is limited to timed intervals, wherein the filtration assembly is disposed externally of the enclosure assembly in fluid communication with the outlet port assembly enabling the noxious gases to be urged from the enclosure assembly; and
   a motion detector and a light emitting diode disposed remotely from the air filtration assembly within a detachable module positioned in the enclosure assembly, wherein the detachable module is electrically interconnected to the brushless fan motor, the timer and a power source.

2. The odor-removing trap system for cat litter boxes of claim 1 further including a lid member disposed in closing relation to the body member.

3. The odor-removing trap system for cat litter boxes of claim 1 further comprising an exhaust line assembly disposed in fluid communication with the brushless fan motor.

4. The odor-removing trap system for cat litter boxes of claim 3 wherein the enclosure assembly further includes a litter gate assembly positioned within the body member adjacent the entry opening.

5. The odor-removing trap system for cat litter boxes of claim 1 wherein the brushless fan motor is integrated within a filtration assembly, wherein the filtration assembly is disposed within the enclosure assembly in fluid communication with the outlet port assembly.

6. The odor-removing trap system for cat litter boxes of claim 5 wherein the air filtration assembly further comprises a timer, a motion detector and a light emitting diode electrically interconnected to the brushless fan motor and the power source, wherein operation of the brushless fan motor is limited to timed intervals.

7. The odor-removing trap system for cat litter boxes of claim 6 wherein the fan motor is powered by a battery.

8. The odor-removing trap system for cat litter boxes of claim 1 wherein the enclosure assembly further includes a floor pan to contain any overflow of cat litter.

9. An odor-removing trap system for use in combination with a cat litter box, the system comprising:
   an enclosure assembly including an entry opening, wherein the enclosure assembly further comprises a tent-like cover including an airtight gas trap formed in an upper interior portion thereof, wherein the tent-like cover is attached to a supporting frame structure for collecting noxious gases emanating from a cat litter box contained therein;
   an outlet port assembly disposed in fluid communication with said enclosure assembly, wherein the outlet fixture provides a pathway for egress of the noxious gases;
   a brushless fan motor disposed in fluid communication with the outlet port assembly, wherein the brushless fan motor is integrated within a detachable air filtration assembly including an activated charcoal filter element for absorption of the noxious gases, wherein the air filtration assembly further comprises a timer electrically interconnected to the brushless fan motor, wherein operation of the brushless fan motor is limited to timed intervals, wherein the filtration assembly is disposed externally of the enclosure assembly in fluid communication with the outlet port assembly enabling the noxious gases to be urged from the enclosure assembly; and
   a motion detector and a light emitting diode disposed remotely from the air filtration assembly within a detachable module positioned in the enclosure assembly, wherein the detachable module is electrically interconnected to the brushless fan motor, the timer and a power source.

10. The odor-removing trap system of claim 9 further comprising an exhaust line assembly disposed in fluid communication with the brushless fan motor.

11. The odor-removing trap system of claim 10 wherein the enclosure assembly further comprises a litter gate assembly positioned therein adjacent the entry opening.

12. The odor-removing trap system for cat litter boxes of claim 9 wherein the enclosure assembly further includes a floor pan to contain any overflow of cat litter.

13. The odor-removing trap system of claim 9 wherein the fan motor is integrated within an air filtration assembly including an activated charcoal filter element for absorption of the noxious gases, wherein the filtration assembly is disposed within the enclosure assembly in fluid communication with the outlet port assembly.

14. The odor-removing trap system of claim 13 wherein the air filtration assembly further comprises a timer, a motion detector and a light emitting diode electrically interconnected to the brushless fan motor and the power source, wherein operation of the brushless fan motor is limited to timed intervals.

15. The odor-removing trap system of claim 14 wherein the fan motor is powered by a battery.

16. An odor-removing trap system for removal of noxious gases emanating from cat litter boxes, the odor-removing trap system comprising:
   (a) an enclosure assembly including an entry opening;
   (b) an outlet port assembly disposed in fluid communication with the enclosure assembly;
   (c) an air filtration assembly including an activated charcoal filter element for absorption of noxious gases therein, wherein the air filtration assembly further includes a brushless fan motor disposed in fluid communication with the outlet port assembly, wherein the air filtration assembly is disposed extremely of the enclosure assembly in fluid communication with the outlet port assembly;

(d) a timer electrically interconnected to the brushless fan motor, wherein operation of the brushless fan motor is limited to timed intervals;

(e) a motion detector and a light emitting diode disposed remotely from the air filtration assembly within a detachable module positioned in the enclosure assembly, wherein the detachable module is electrically interconnected to the brushless fan motor and the timer; and (f) a power source electrically connected to the brushless fan motor for operation thereof; wherein the enclosure assembly further comprises a body member for collecting the noxious gases emanating from cat litter contained therein; wherein the brushless fan motor is integrated within the air filtration assembly disposed in fluid communication with the outlet port assembly; wherein the power source functions to actuate the brushless fan motor to urge the noxious gases into the air filtration assembly for discharge from the enclosure assembly.

* * * * *